（12）United States Patent
Davenport et al.

(10) Patent No.: US 9,557,044 B2
(45) Date of Patent: Jan. 31, 2017

(54) LED LAMP WITH DUAL MODE OPERATION

(71) Applicant: Energy Focus, Inc., Solon, OH (US)

(72) Inventors: John M. Davenport, Tuscon, AZ (US); David Bina, Northfield Center, OH (US); Jeremiah Heilman, Middleton, WI (US)

(73) Assignee: Energy Focus, Inc., Solon, OH (US)

( * ) Notice: Subject to any disclaimer, the term of this patent is extended or adjusted under 35 U.S.C. 154(b) by 0 days.

(21) Appl. No.: 14/702,591

(22) Filed: May 1, 2015

(65) Prior Publication Data

US 2016/0109070 A1    Apr. 21, 2016

Related U.S. Application Data

(63) Continuation-in-part of application No. 14/555,294, filed on Nov. 26, 2014, now abandoned.
(Continued)

(51) Int. Cl.
*H05B 33/08* (2006.01)
*F21V 25/00* (2006.01)
(Continued)

(52) U.S. Cl.
CPC ............. *F21V 25/00* (2013.01); *F21K 9/175* (2013.01); *F21K 9/27* (2016.08); *F21V 23/02* (2013.01); *F21V 23/06* (2013.01); *H05B 33/0809* (2013.01)

(58) Field of Classification Search
CPC ...... F21Y 2103/003; F21K 9/175; F21K 9/17; F21K 9/00; H05B 33/0806; H05B 33/0803; H05B 33/0809; H05B 33/0815; H05B 33/0842; H05B 33/0812; H05B 33/0887; H05B 37/02; H05B 20/386; H05B 20/346; Y02B 20/46; F21V 25/00; F21V 23/02; F21V 23/06
See application file for complete search history.

(56) References Cited

U.S. PATENT DOCUMENTS 6,853,151 B2    2/2005 Leong et al.
6,860,628 B2    3/2005 Robertson et al.
(Continued)

FOREIGN PATENT DOCUMENTS

CN    101855943 A    10/2010
CN    201795353 U    4/2011
(Continued)

OTHER PUBLICATIONS

"Quick Installation Guide, Philips GreenPower TLED InstantFit Lamp—USA," Jan. 2014, http://www.goldbio.com/documents/1368/259358-Quick+Installation+Guide.pdf.
(Continued)

*Primary Examiner* — Vibol Tan
(74) *Attorney, Agent, or Firm* — Bruzga & Associates; Charles E. Bruzga

(57) ABSTRACT

An LED lamp has dual modes of operation from fluorescent lamp fixtures. A first circuit powers at least one LED in a first mode of operation when first and second power pins at a first end of the lamp are inserted into power contacts of the fixture that are directly connected to power mains. A second circuit powers at least one LED in a second mode of operation when the second power pin at the first end of the lamp and a third power pin at a second end of the lamp are inserted into power contacts of a fixture powered from an electronic ballast. First and second conduction control means permit the second circuit to power at least one LED during the second mode of operation.

20 Claims, 16 Drawing Sheets

Related U.S. Application Data

(60) Provisional application No. 62/066,306, filed on Oct. 20, 2014.

(51) Int. Cl.
*F21K 99/00* (2016.01)
*F21V 23/02* (2006.01)
*F21V 23/06* (2006.01)

(56) References Cited

U.S. PATENT DOCUMENTS

| | | | |
|---|---|---|---|
| 6,936,968 | B2 | 8/2005 | Cross et al. |
| 6,997,576 | B1 | 2/2006 | Lodhie et al. |
| 7,053,557 | B2 | 5/2006 | Cross et al. |
| 7,067,992 | B2 | 6/2006 | Leong et al. |
| 7,218,056 | B1 | 5/2007 | Harwood |
| 7,507,001 | B2 | 3/2009 | Kit |
| 8,089,213 | B2 | 1/2012 | Park |
| 8,322,878 | B2 | 12/2012 | Hsia et al. |
| 8,330,381 | B2 | 12/2012 | Langovsky |
| 8,358,056 | B2 | 1/2013 | Park |
| 8,502,454 | B2 | 8/2013 | Sadwick |
| 8,531,109 | B2 | 9/2013 | Visser et al. |
| 8,575,856 | B2 | 11/2013 | Chung et al. |
| 8,622,571 | B2 * | 1/2014 | Hartikka ............ H05B 33/0803 362/221 |
| 8,624,509 | B2 * | 1/2014 | Hartikka ................ F21K 9/00 315/186 |
| 8,643,298 | B2 | 2/2014 | Palazzolo et al. |
| 8,664,880 | B2 | 3/2014 | Ivey et al. |
| 8,664,892 | B2 | 3/2014 | Radermacher |
| 8,680,958 | B2 | 3/2014 | Radermacher |
| 8,698,406 | B2 | 4/2014 | Radermacher |
| 8,729,809 | B2 | 5/2014 | Kit et al. |
| 8,749,167 | B2 | 6/2014 | Hsia et al. |
| 8,766,557 | B2 | 7/2014 | Hariharan |
| 8,779,679 | B2 | 7/2014 | Miyamichi |
| 8,783,917 | B2 | 7/2014 | Mrakovich |
| 8,791,650 | B2 | 7/2014 | Shan |
| 8,794,793 | B2 | 8/2014 | van de Ven et al. |
| 8,796,943 | B2 | 8/2014 | Miyamichi |
| 9,163,818 | B2 * | 10/2015 | Hsia ..................... F21V 25/04 |
| 2008/0151535 | A1 | 6/2008 | de Castris |
| 2009/0167202 | A1 | 7/2009 | Miskin et al. |
| 2009/0303720 | A1 | 12/2009 | McGrath |
| 2010/0033095 | A1 | 2/2010 | Sadwick |
| 2010/0096976 | A1 | 4/2010 | Park |
| 2010/0181925 | A1 | 7/2010 | Ivey et al. |
| 2010/0244696 | A1 | 9/2010 | Kim |
| 2011/0043127 | A1 | 2/2011 | Yamasaki |
| 2011/0057572 | A1 | 3/2011 | Kit et al. |
| 2011/0279033 | A1 | 11/2011 | Yang et al. |
| 2012/0161666 | A1 | 6/2012 | Antony et al. |
| 2012/0242241 | A1 | 9/2012 | Schmacht |
| 2012/0274237 | A1 | 11/2012 | Chung et al. |
| 2012/0299494 | A1 * | 11/2012 | Hartikka ............ H05B 33/0842 315/201 |
| 2012/0306403 | A1 * | 12/2012 | Chung ............... H05B 33/0818 315/291 |
| 2013/0057171 | A1 | 3/2013 | Liscinsky et al. |
| 2013/0093309 | A1 * | 4/2013 | Deppe .................. F21V 25/04 313/51 |
| 2013/0234600 | A1 | 9/2013 | Park |
| 2013/0293131 | A1 | 11/2013 | Sadwick |
| 2013/0335959 | A1 * | 12/2013 | Hsia ..................... F21V 25/00 362/221 |
| 2013/0342116 | A1 | 12/2013 | Park |
| 2014/0062320 | A1 | 3/2014 | Urano et al. |
| 2014/0084793 | A1 | 3/2014 | Park |
| 2014/0111111 | A1 | 4/2014 | Chitta et al. |
| 2014/0111112 | A1 | 4/2014 | Park |
| 2014/0132164 | A1 | 5/2014 | McBryde et al. |
| 2014/0159592 | A1 | 6/2014 | Pan et al. |
| 2014/0197748 | A1 | 7/2014 | Pan et al. |
| 2014/0203714 | A1 | 7/2014 | Zhang et al. |
| 2014/0203717 | A1 | 7/2014 | Zhang |
| 2014/0204571 | A1 | 7/2014 | Zhang et al. |
| 2014/0225520 | A1 | 8/2014 | Zhang |
| 2014/0239814 | A1 | 8/2014 | Pan et al. |
| 2014/0239827 | A1 | 8/2014 | Park |
| 2014/0265900 | A1 | 9/2014 | Sadwick et al. |
| 2015/0015150 | A1 * | 1/2015 | Dankovits .......... H05B 33/0809 315/200 R |
| 2015/0061520 | A1 * | 3/2015 | Tao .................... H05B 33/0806 315/200 R |
| 2015/0181661 | A1 * | 6/2015 | Hsia ...................... F21V 25/04 315/160 |
| 2015/0260384 | A1 * | 9/2015 | Purdy ................. H05B 33/0815 362/221 |
| 2015/0351171 | A1 * | 12/2015 | Tao ......................... F21K 9/175 315/185 R |

FOREIGN PATENT DOCUMENTS

| | | | | |
|---|---|---|---|---|
| CN | 102695312 A | 9/2012 | | |
| CN | 202535597 U | 11/2012 | | |
| CN | 202603010 U | 12/2012 | | |
| CN | 202721866 U | 2/2013 | | |
| CN | 202738193 U | 2/2013 | | |
| CN | 202931620 U | 5/2013 | | |
| CN | 20364589 U | 6/2014 | | |
| EP | 2482618 A2 * | 8/2012 | ......... | H05B 33/0842 |
| KR | 10-2012-0124756 A | 11/2012 | | |
| WO | 2009/064099 A2 | 5/2009 | | |
| WO | 2012/068687 A1 | 5/2012 | | |
| WO | 2014115010 A1 | 7/2014 | | |

OTHER PUBLICATIONS

"Cree Delivers the First No-Compromise LED T8 Replacement Tube," May 5, 2014, www.cree.com/News-and-Events/Cree-News/Press-Releases/2014/May/T8-tube-release.

"EF-300D-oval-series-Specs3," www.energyfocusinc.com/wp-content/uploads/EF_300D_W.pdf (last visited Sep. 19, 2014).

"Bramal LED T-10 Luminaire, User Guide," Nov. 2014, www.bramal.com/wp-content/uploads/2014/11/Bramal-T-10-LED-Fluorescent-Light-Installation-and-Operating-manual-MM-6AE-1.pdf.

"Energy Focus announces Patent Filing for LED Tube Lighting Technology," Dec. 3, 2014, www.energyfocusinc.com/energy-focus-announces-patent-filing-for-led-tube-lighting-technology/.

"Energy Focus, Inc. Announces the Launch of its Commercial Intellitube," Apr. 8, 2015, www.energyfocusinc.com/energy-focus-inc-announces-the-launch-of-its-commercial-intellitube/.

"3' Commercial Intellitube spec sheet," Apr. 9, 2015, www.energyfocusinc.com/wp-content/uploads/3ft_intellitube_W.pdf.

P. Horowitz et al., The Art of Electronics (Cambridge University Press: Cambridge 1989), at p. 32.

J. Zhu et al., "Novel Capacitor-Isolated Power Converter," Energy Conversion Congress and Exposition (ECCE), 2010 IEEE held in Atlanta, GA (Sep. 2010): pp. 1824-1829.

"Galvanic Isolation," Wikipedia (Sep. 12, 2011), http://en.wikipedia.org/w/index.php?title=Galvanic_isolation&oldid=449965801.

J. Zhang et al, "A Capacitor-Isolated LED Driver with Inherent Current Balance Capability," IEEE Transactions on Industrial Electronics vol. 59 (Apr. 2012): pp. 1708-1716.

* cited by examiner

LED LAMP WITH DUAL MODE OPERATION

FIELD OF THE INVENTION

The present invention relates to an LED lamp with dual mode operation from a fluorescent lamp fixture wired to supply either mains power or power from an electronic ballast associated with the fixture.

BACKGROUND OF THE INVENTION

One conventional, elongated LED lamp can be retrofit into an existing fluorescent lamp fixture whose wiring is reconfigured so as to directly supply mains power to the LED lamp. With such an LED "retrofit" lamp, power is typically supplied to the lamp from a pair of power pins on one end of the lamp, with the pair of connector pins at the other end of the lamp not powering the lamp but providing mechanical support for the lamp. The foregoing arrangement for powering the lamp from the power pins at one end of the lamp has the benefit of limiting exposure to potentially life-threatening electrical shock from the mains current to a lamp installer during lamp installation.

A second conventional, elongated LED lamp can be retrofit into an existing fluorescent lamp fixture so as to use a fluorescent lamp electronic ballast contained in the fixture without reconfiguring the fixture wiring. As is the case with fluorescent lamps, the LED retrofit lamp obtains power from power pins at both (i.e., opposite) ends of the lamp. A representative LED retrofit lamp of this type is disclosed in U.S. Pat. No. 8,089,213 B2 to Park. The Park LED lamp has a single mode of operation from an existing fluorescent lamp ballast associated with a fluorescent lamp fixture. Park teaches the use of capacitors C11-C14 in his FIG. 1 to "control the capacitance of a series resonant circuit of a fluorescent lamp ballast" at Col. 4, II. 26-30. Inasmuch as Park teaches fluorescent lamp ballasts having a high frequency of 50 kHz (Col. 8, I. 58 & Col. 11, I. 4), capacitors C11-C14, of necessity, have a high impedance at typical mains frequencies of 50 or 60 Hz. Accordingly, capacitors C11-C14 provide the benefit of sufficiently attenuating any current at typical mains frequencies so as to prevent a potentially life-threatening electrical shock hazard if the LED retrofit lamp is accidentally placed into a fluorescent lamp ballast wired directly to power mains.

Lamp designers have recognized that it would be desirable to have an LED retrofit lamp with dual mode operation from either an existing fluorescent lamp ballast associated with a fluorescent lamp fixture, or directly from power mains. U.S. Pat. No. 8,575,856 B2 to Chung et al. provides an LED lamp with dual mode operation. However, a single, master circuit is used to power LEDs in the lamp whether the power is supplied by AC mains or whether the power is supplied by an existing fluorescent lamp electronic ballast. This attempt suffers in potential performance regarding energy efficiency and stability compared to an LED lamp that operates only from AC mains power, or an LED lamp that operates only from power supplied by a fluorescent lamp electronic ballast.

The Chung et al. LED lamp is also flawed in that it fails to mitigate a potentially life-threatening electrical shock hazard when a lamp is placed into a fixture that is wired directly to power mains. This is because, in the case of AC mains operation, power is applied across the LED lamp through the same circuit used when the fluorescent lamp electronic ballast is present. As a result, a potential shock hazard is created, which may be life-threatening to a lamp installer during lamp installation.

It would, therefore, be desirable to provide an LED retrofit lamp with dual mode operation from an existing fluorescent lamp electronic ballast associated with a fluorescent lamp fixture, as well as, alternatively, directly from power mains in an efficient and stable manner. It would also be desirable to provide such as lamp that can be configured to avoid a potential life-threatening electrical shock hazard when such a lamp is placed into a fixture wired to supply power directly from power mains.

SUMMARY OF THE INVENTION

The present invention combines dual modes of operation of an LED retrofit lamp. In a first mode, the LED retrofit lamp receives power from power mains in a fluorescent lamp fixture; in an alternative, second mode, the LED retrofit lamp receives power from a fluorescent lamp electronic ballast in a fluorescent lamp fixture. In the first mode, the LED lamp can be wired to receive power from a pair of power pins at one end of the lamp. In the second mode, the LED lamp receives power from a fluorescent lamp electronic ballast associated with the lamp fixture. The foregoing dual mode operation is accomplished through the use of first and second circuits respectively dedicated to the first and second modes of operation. While the first and second circuits share one common power pin on the LED lamp and typically power the same LEDs, the first and second circuits may be electrically isolated from each other via novel conduction control arrangements.

In one form, the present invention provides an LED lamp with dual mode operation for insertion into a fluorescent lamp fixture. The lamp fixture is wired to supply to the LED lamp either mains power or power from an electronic ballast supplying AC power at a ballast frequency. The LED lamp comprises an elongated housing having first and second ends. The first end of the elongated housing is provided with first and second power pins. The second end of the elongated housing is provided with a third power pin. A first circuit is intended to provide power to at least one LED contained within the elongated housing. The foregoing at least one LED is adapted to be powered in a first mode from power mains and to provide external light along a length of the elongated housing. The first mode occurs when the LED lamp is inserted into a fluorescent lamp fixture having power contacts that receive the first and second power pins and that are directly connected to the power mains supplying power at a mains frequency much lower than the ballast frequency. The first circuit limits current to the at least one LED adapted to be powered in a first mode. A second circuit is intended to provide primary power to at least one LED adapted to be powered in a second mode from the electronic ballast and to provide external light along a length of the elongated housing. The second mode occurs when the LED lamp is inserted into a fluorescent lamp fixture having power contacts that receive the second and third power pins, at opposite lamp ends, and that are connected to the electronic ballast for receiving power therefrom. The second circuit includes a rectifier circuit adapted to receive power from the second and third power pins. A first conduction control means serially connected between the second power pin and the rectifier circuit is adapted to permit the second circuit to power the at least one LED adapted to be powered in the second mode when the second and third power pins, at opposite lamp ends, are connected to the electronic ballast. A second conduction control means serially connected between the third power pin and the rectifier circuit is adapted to permit the second circuit to power the at least one LED adapted to be powered in the second mode when the second and third power pins, at opposite lamp ends, are connected to the electronic ballast.

In some embodiments, the at least one LED for being powered in a first mode and the at least one LED for being powered in a second mode have at least one LED in common. In other embodiments, the at least one LED for being powered in a first mode and the at least one LED for being powered in a second mode do not have any LEDs in common.

The foregoing LED lamp can be retrofit into an existing fluorescent lamp fixture and has dual mode operation either from an existing fluorescent lamp electronic ballast associated with the lamp fixture, or, alternatively, directly from power mains. Beneficially, the LED lamp can be configured to mitigate a potentially life-threatening electrical shock hazard when such a lamp is placed into a fixture wired to supply power directly from power mains. Some embodiments of the inventive lamp are configured to provide additional protection against shock exposure to a lamp installer.

Further, the foregoing LED lamp is more efficient to operate than using, as various prior art references teach, a single master circuit that senses whether a lamp fixture supplies power from an electronic ballast or directly from power mains, and that provides appropriate power to LEDs. Rather than using such a master circuit, as the foregoing summary of the invention teaches, the present invention uses first and second circuits to receive either mains power or power from an existing fluorescent lamp ballast. This approach eliminates the energy loss that results when using an active LED driver in a master circuit to reprocess power from an existing fluorescent lamp ballast. This approach also typically allows the second circuit to be formed inexpensively from a few passive components, such as a diode rectifier circuit and one or more capacitors.

BRIEF DESCRIPTION OF THE DRAWINGS

Further features and advantages of the invention will become apparent from reading the following detailed description in conjunction with the following drawings, in which like reference numbers refer to like parts.

DETAILED DESCRIPTION

The examples and drawings provided in the detailed description are merely examples, and should not be used to limit the scope of the claims in any claim construction or interpretation.

DEFINITIONS

In this specification and appended claims, the following definitions apply:

An "active component" connotes a controllable electrical component that supplies controllable energy in the form of voltage or current to a circuit containing the active component. Examples of active components are transistors.

An "active circuit" connotes a circuit using a control loop that incorporates feedback and an active element for the purpose of limiting current to a load.

A "passive component" connotes an electrical component that is incapable of supplying externally controllable energy in the form of voltage or current into a circuit containing the passive component. Examples of passive components are rectification diodes, LED diodes, resistors, capacitors, inductors, or magnetic ballasts operating at 50 or 60 Hz.

A "passive circuit" connotes a circuit that does not include an active component as defined herein.

An "electronic ballast for a fluorescent lamp" or the like connotes an instant start ballast, a rapid start ballast, a programmed start ballast, and other ballasts that use switch-mode power supplies to realize current-limiting for fluorescent lamps. An "electronic ballast for a fluorescent lamp ballast" does not include a so-called magnetic ballast.

"Power mains" connote the conductors through which AC or DC electrical power is supplied to end users. AC power is typically supplied at a frequency between about 50 and 60 Hz, and typically between about 100 and 344 volts RMS. Specialized power mains provide power at 400 Hz. A frequency of zero for power mains corresponds herein to DC power.

An "isolation" transformer, as that term is used herein, is not restricted to having a winding turns ratio of 1:1.

Other definitions are provided in the following description for "conduction control means" and the word "permit," by way of example.

Fluorescent Lamp Fixtures

Figure 1:
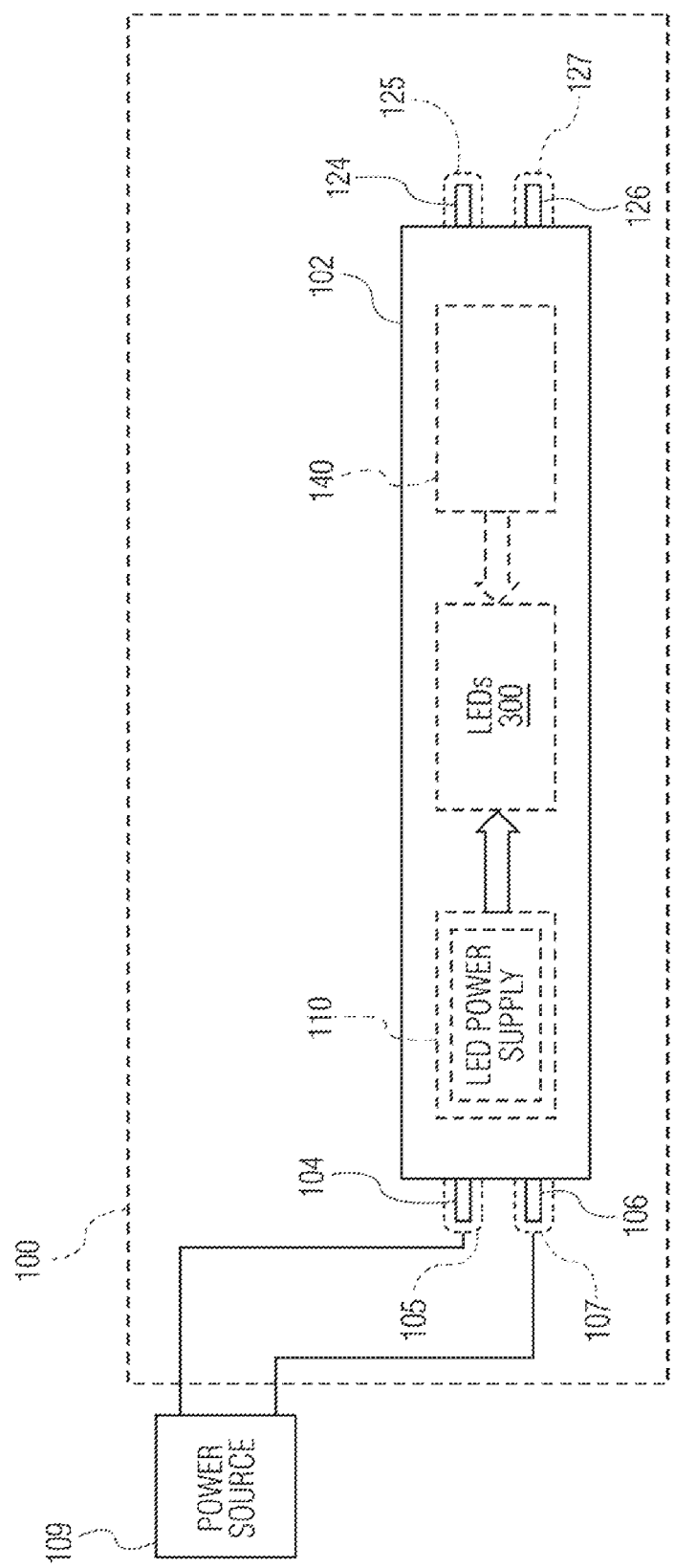
FIG. 1 is an electrical schematic diagram, partially in block form, of a fluorescent lamp fixture that is wired to provide mains power directly to power pins of an LED lamp in accordance with the invention.

FIG. 1 shows an exemplary fluorescent lamp fixture 100 for an elongated LED lamp 102. Fluorescent lamp fixture 100 is wired to supply mains power from a power source 109 to first and second power pins 104 and 106 via respective power contacts 105 and 107. Power contacts 125 and 127, which are not wired to receive mains power, receive third and fourth power pins 124 and 126, respectively, so as to mechanically support the power pins. A first circuit 110 including an LED power supply conditions the power supplied by power source 109 for driving LEDs 300 in LED lamp 102, such as by limiting current to the LEDs. LED lamp 102 also includes a second circuit 140 that is not used in FIG. 1, because second circuit 140 is designed to receive power from a fluorescent lamp electronic ballast, which is not used in FIG. 1.

Power source 109 may be an AC source with a typical power mains frequency of 50 or 60 Hz or 400 Hz. Power source 109 may also be a DC power source, in which case the mains frequency is considered zero.

Referring again to FIG. 1, the claimed invention contemplates first and second power pins on one end of LED lamp 102 and a third power pin 124 at the other end of the lamp. It is not important that first power pin 106 be axially displaced from third power pin 124 as shown in FIG. 1; they could also be axially aligned with each other. Second circuit 140 in LED lamp 102 is not used in FIG. 2, because second circuit 140 is designed to receive power from a fluorescent lamp electronic ballast, which is not used in FIG. 2.

Figure 2:
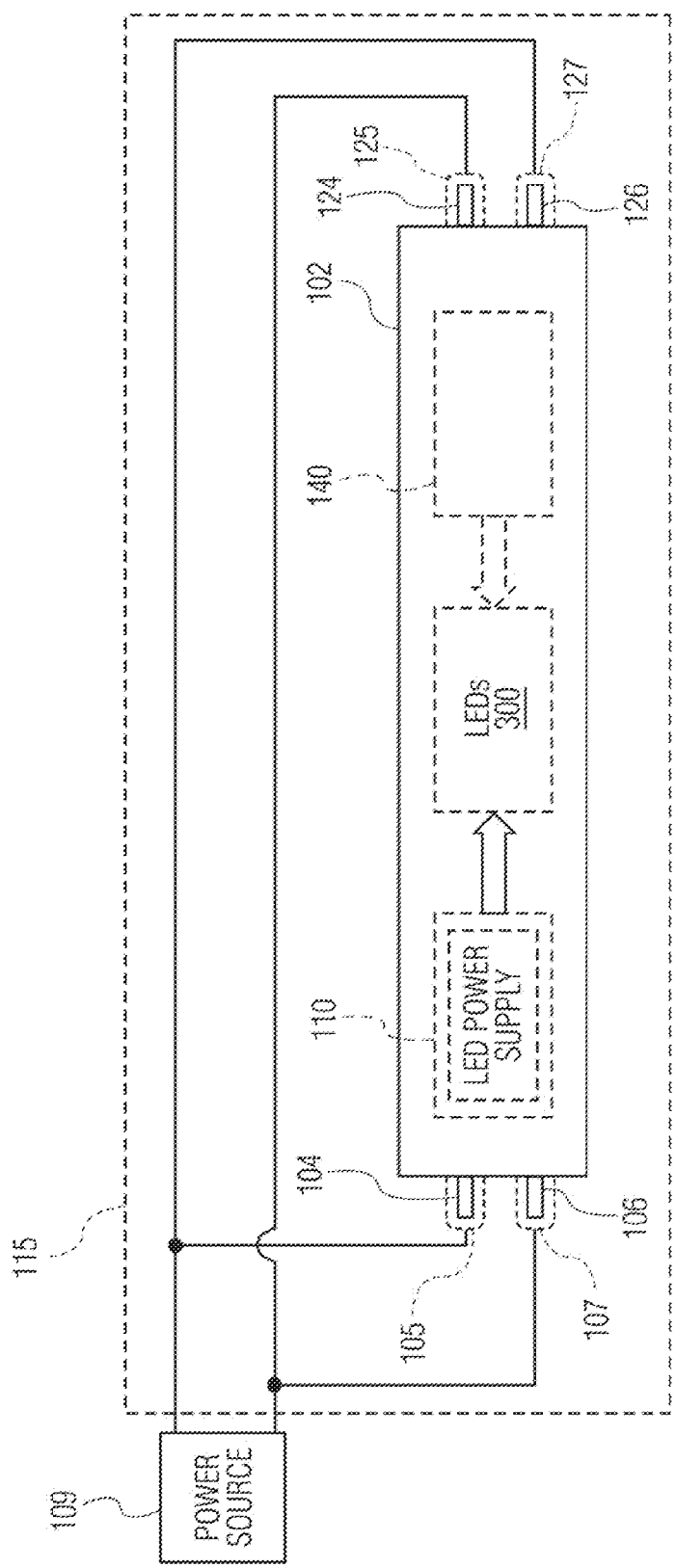
FIG. 2 is similar to FIG. 1, but provides mains power to all four power contacts of the fluorescent lamp fixture.

FIG. 2 is similar to FIG. 1, but shows an exemplary fluorescent lamp fixture 115 that provides mains power from power source 109 to all four power pins 104, 106, 124 and 126 of LED lamp 102. Mains power is supplied to third and fourth power pins 124 and 126 via power contacts 125 and 127, respectively, of fluorescent lamp fixture 115. First circuit 110, which includes an LED power supply, conditions the power supplied by power source 109 for driving LEDs 300 in LED lamp 102, such as by limiting current to the LEDs. In contrast to fluorescent lamp fixture 100 of FIG. 1, if LED lamp 102 is inserted into fluorescent lamp fixture 115 in the reverse direction, mains power would be supplied to first circuit 110 via power contacts 125 and 127.

Figure 3:
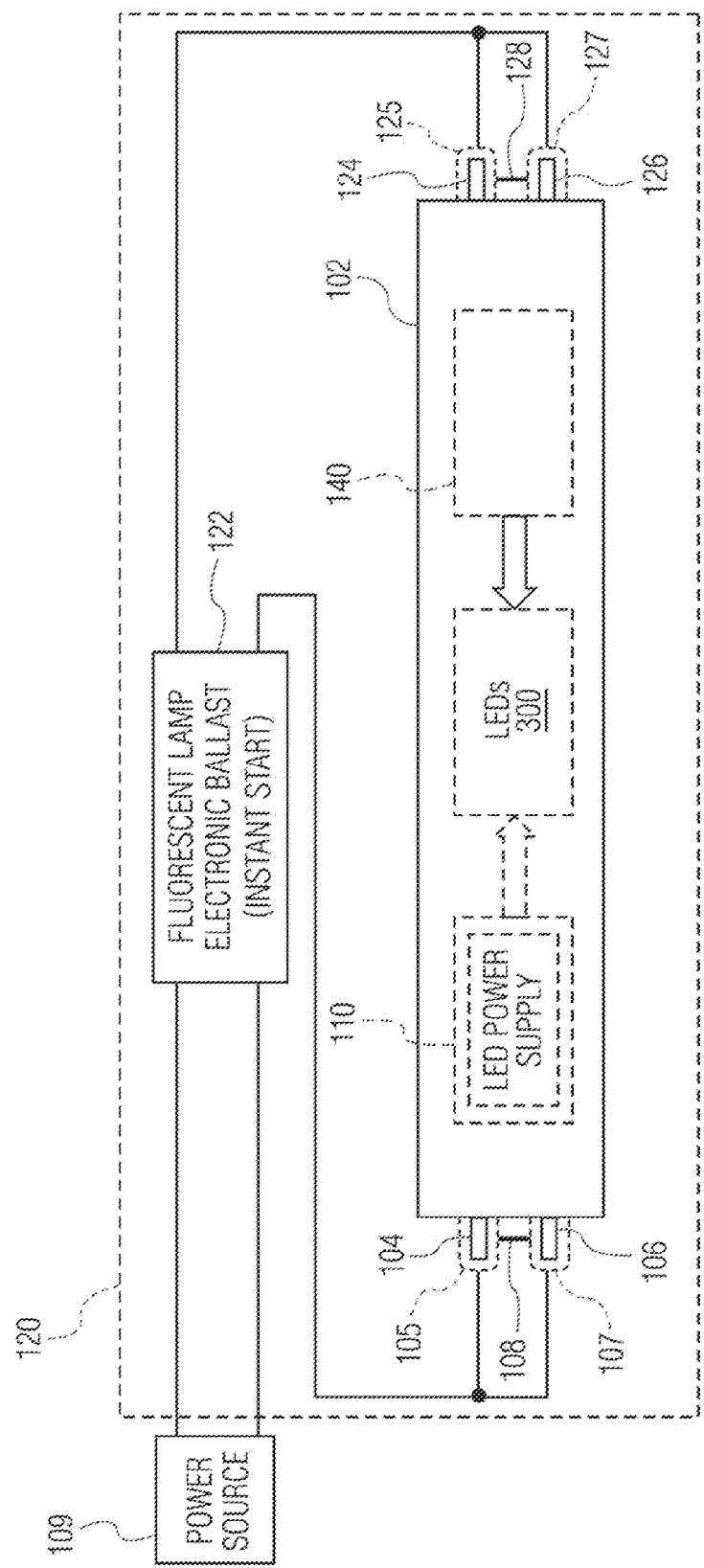
FIGS. 3 and 4 are electrical schematic diagrams, partially in block form, of a fluorescent lamp fixture including a respective type of fluorescent lamp electronic ballast and an LED lamp in accordance with the invention.

FIG. 3 shows an exemplary fluorescent lamp fixture 120, including a fluorescent lamp electronic ballast 122 of the instant start type, which supplies power to LEDs 300 in LED lamp 102 as shown in FIG. 1 or 2, via a second circuit 140. Second circuit 140 receives power, at the frequency of fluorescent lamp electronic ballast 122 of the instant start type, through power pins as opposite ends of the lamp; this contrasts with the reception of mains power by first circuit 110 in FIGS. 1 and 2 by a pair of power pins 104 and 106 at the same end of the lamp 102. In FIG. 3, electrical power from fluorescent lamp electronic ballast 122 is supplied to LED lamp 102 through second power pin 106, via power contact 107, and through third power pin 124, via power contact 127. Second and third power pins 106 and 126 are on opposite ends of the lamp. For convenience when using a fluorescent lamp electronic ballast 122 of the instant start type, power contacts 105 and 107 may optionally be shorted together by an electrical short 108, and power contacts 125 and 127 may be shorted together by an electrical short 128. Fourth power pin 126 need not be connected to circuitry within the lamp, as indicated in the figure.

Figure 4:
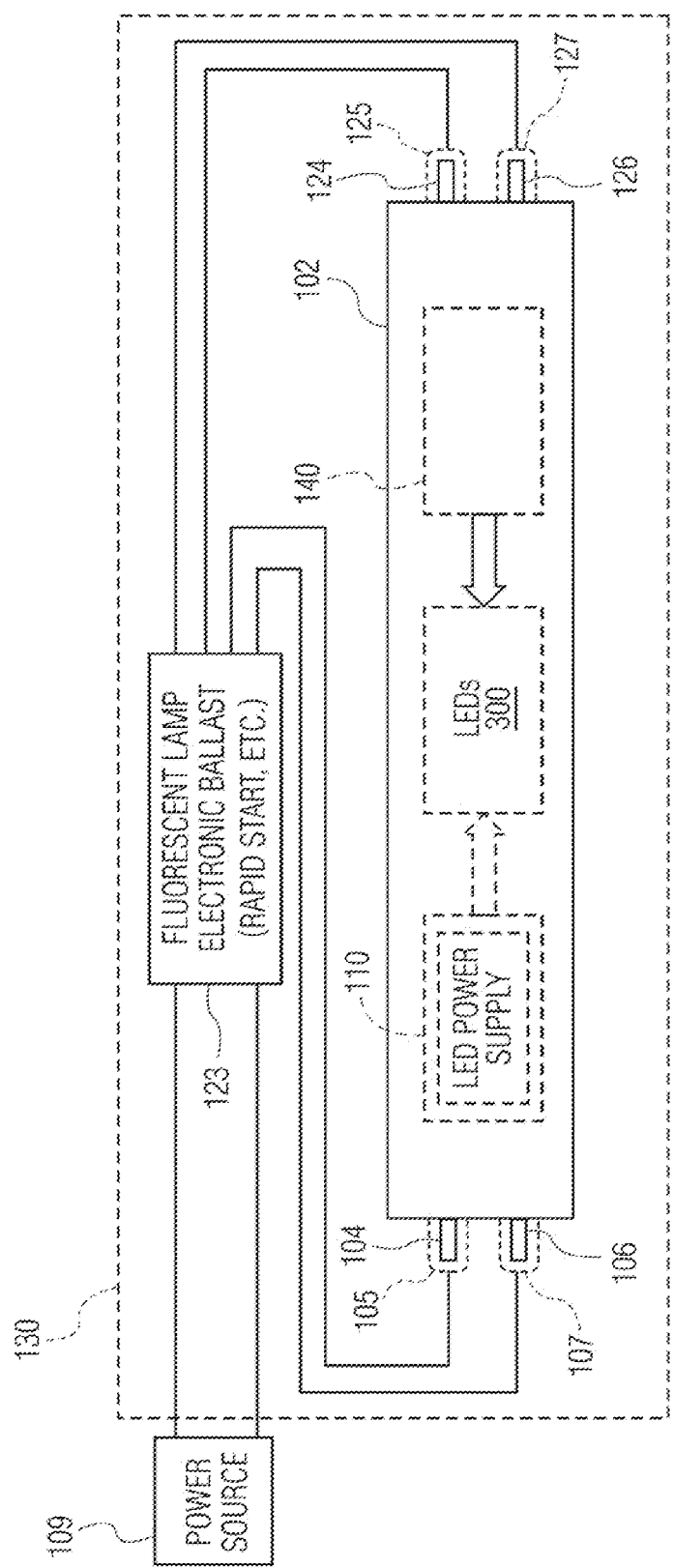

FIG. 4 shows an exemplary fluorescent lamp fixture 130, including a fluorescent lamp electronic ballast 122 that differs from fluorescent lamp electronic ballast 122 (FIG. 3) of the instant start type. Fluorescent lamp electronic ballast 123 (FIG. 4) may be of the rapid start type or programmed start type, by way of example. As in FIG. 3, fluorescent lamp fixture 130 supplies power to LEDs 300 of the same LED lamp 102 as shown in FIG. 1 or 2, via second circuit 200. Second circuit 200 receives power through different power pins as compared with the fluorescent lamp fixtures 100 and 115 of FIGS. 1 and 2. The main difference between fluorescent lamp fixtures 120 (FIG. 3) and 130 (FIG. 4) is that fluorescent lamp fixture 130 provides separate conductors for each of power pins 104, 106, 124 and 126. The use of separate conductors is typical in regard to fluorescent lamp fixtures 130 of the rapid start or programmed start, for instance.

It should be noted that the same LED lamp 102 is described with a first mode of operating when directly wired to power mains in FIG. 1 or 2 and with a second mode of operating from a fluorescent lamp electronic ballast 122 as shown in FIG. 3 or 4.

Circuitry within LED Lamp

Figure 5:
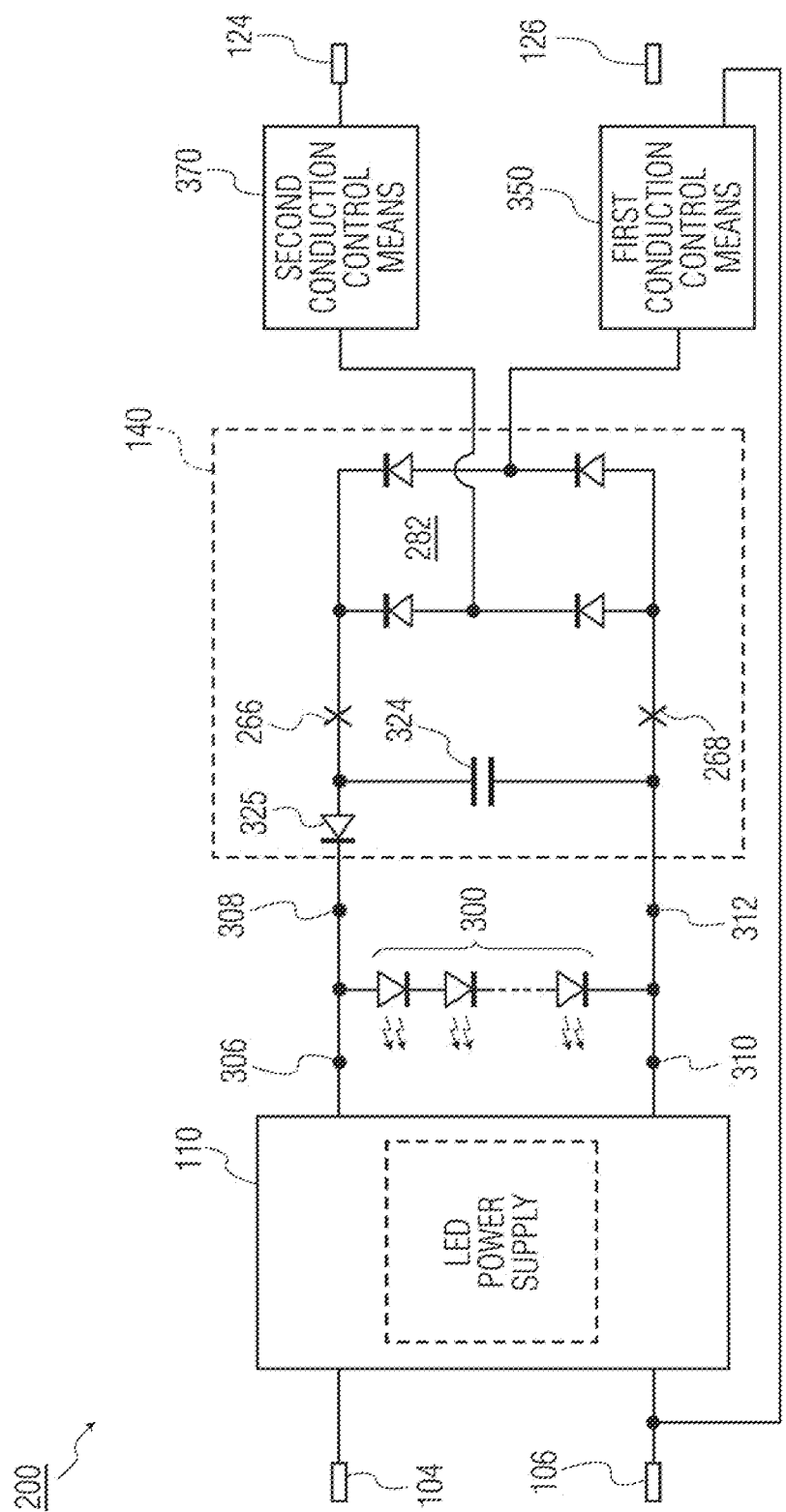
FIG. 5 is an electrical schematic diagram of circuitry within the LED lamp shown in FIGS. 1-4.

FIG. 5 shows circuitry 200 within LED lamp 102 of above-described FIGS. 1-4. Circuitry 200 includes a first circuit 110 and a second circuit 140, either of which can power LEDs 300 depending upon whether (a) fluorescent lamp fixture 100 (FIG. 1) or 115 (FIG. 2) or (b) fluorescent lamp fixture 120 (FIG. 3) or 130 (FIG. 4) is to be used. In FIG. 5, LEDs 300 are shown as a single string of series-connected LEDs, where a "string" as used herein means at least one LED. Serially connected string of LEDs 300 can be replaced using routine skill in the art by one or more (a) parallel connected strings of LEDs, or (b) one or more parallel and serially connected strings of LEDs, or (c) a combination of the foregoing topologies (a) and (b). Preferred LED circuits 303 and 304 including LEDs 300 are shown in FIGS. 6 and 7, respectively.

Electrolytic capacitor 324, shown in second circuit 140, may be shared by first circuit 110. Alternatively, if an optional blocking diode 325 is connected between node 308 and electrolytic capacitor 324, first circuit 110 will not be required to charge such capacitor when first circuit 110 powers LEDs 300. The present inventors have discovered that, in some embodiments, first circuit 110 will not adequately charge electrolytic capacitor 324 of relatively large capacitance, and some flickering of LEDs 300 results. Blocking diode 325 can be formed from a p-n diode or another device that provides for unidirectional current flow, such as a Schottky diode or Silicon Controller Rectifier (SCR). The description for blocking diode 325 appearing in other drawings herein (e.g., FIGS. 5, 12 and 13) is the same as the foregoing description, in accordance with the statement above that "like reference numbers refer to like parts." Electrolytic capacitor 324 can be omitted if alternative energy storage for powering LEDs 300 is provided. By way of example, such alternate energy storage could be an electrolytic capacitor in fluorescent lamp electronic ballast 122 (FIG. 3) or 123 (FIG. 4) or another electrolytic capacitor in first circuit 110 (FIG. 5). Omission of electrolytic capacitor 324 can result in flicker of the LEDs 300 at the ballast frequency, as defined above, which may cause bar code scanners to malfunction.

Figure 6:
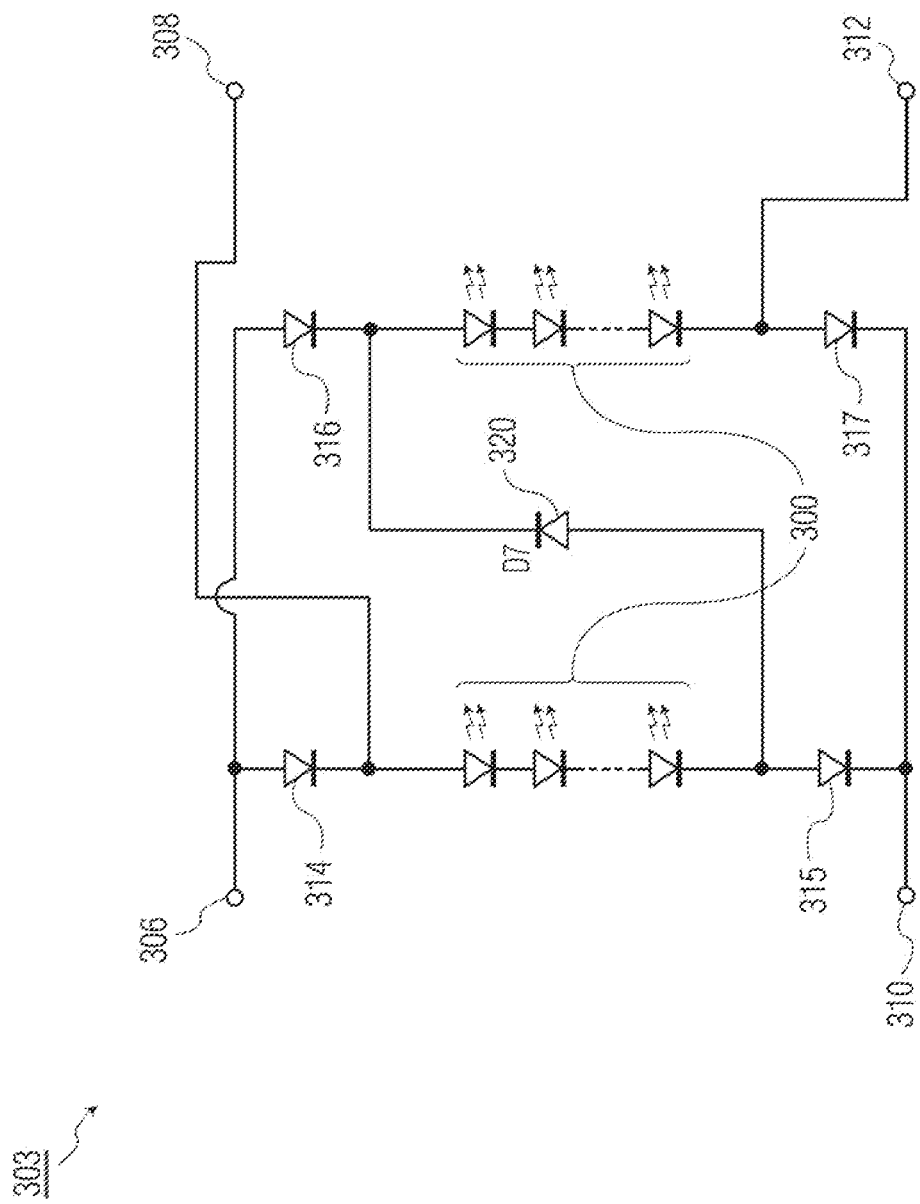
FIGS. 6 and 7 are electrical schematic diagrams showing preferred LED circuits for arranging the LEDs shown in FIG. 5.
Figure 7:
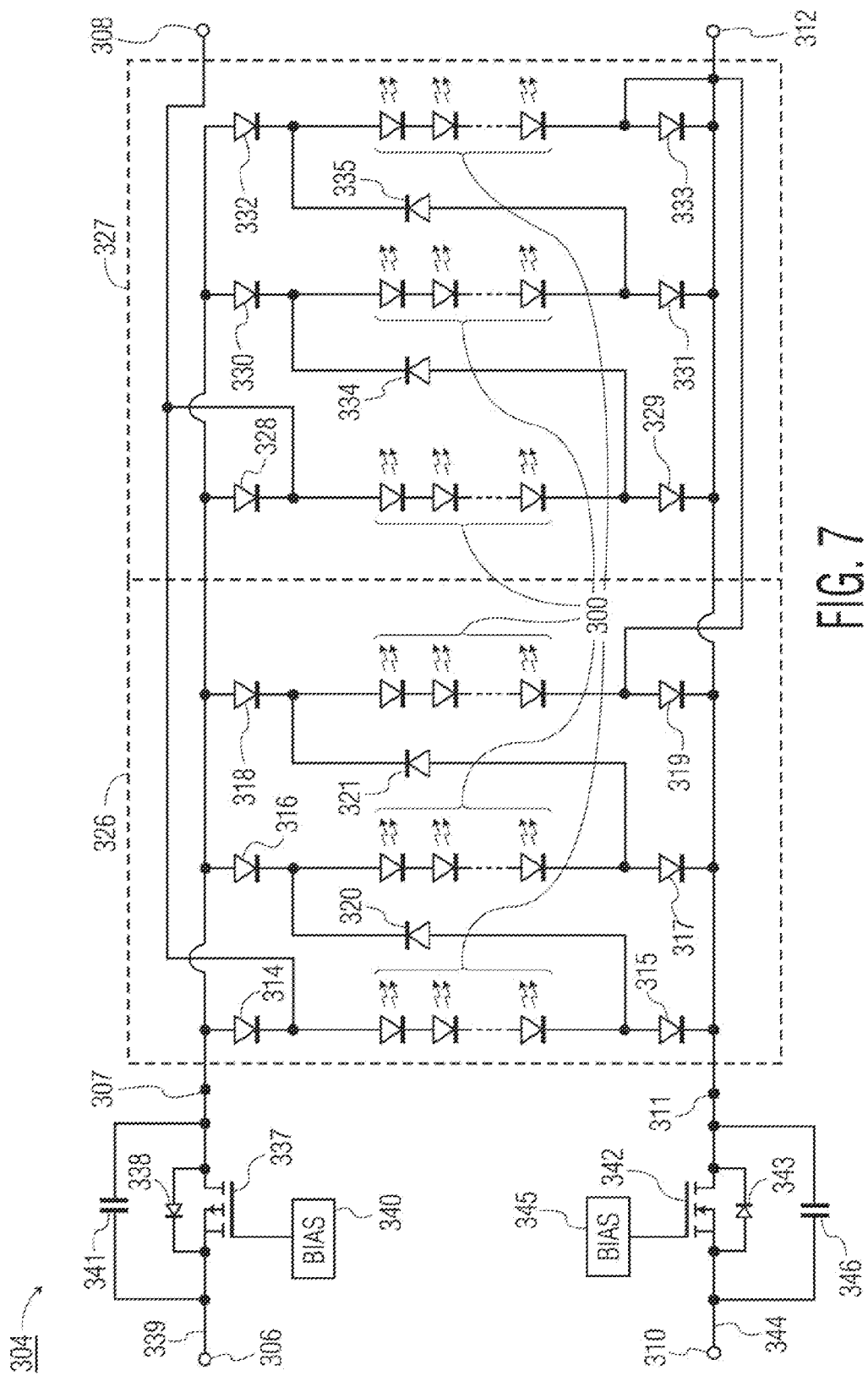

FIG. 6 shows an LED circuit 303 that realizes LEDs 300 and that is connected to the following nodes of circuitry 200 of FIG. 5: Nodes 306 and 308 at the top, and nodes 310 and 312 at the bottom. LEDs 300 in FIG. 6 are interconnected with steering diodes 314, 315, 316, 317 and 320. LEDs 300 are shown in two separate strings that are preferably equal in number when the LEDs have the same voltage ratings. This is to prevent a significant disparity in current through each string of LEDs 300s when powered from first circuit 110. Steering diodes can be formed from a p-n diode or another device that provides for unidirectional current flow, such as a Schottky diode or Silicon Controller Rectifier (SCR).

When LEDs 300 are powered by first circuit 110 (FIG. 5), steering diodes 314, 315, 316 and 317 conduct current, and steering diode 320 does not conduct current because it is reversed biased. As a result, the two strings of LEDs 300 are operated in parallel. With each string of LEDs 300 being 20 in number, and each LED having a voltage rating of approximately 3 volts, the voltage produced by first circuit 110 between nodes 306 and 310 is approximately 60 volts dc. Such voltage can be efficiently produced over the entire typical range of the mains power source 109 (FIGS. 1-4), from 100 volts rms to 300 volts rms, for instance.

On the other hand, when LEDs 300 in LED circuit 303 of FIG. 6 are powered by second circuit 140 (FIG. 5), current is supplied to the two strings of LEDs in series; that is, from node 308 through the left-shown string of LEDs 300, then through steering diode 320 and down through the right-shown string of LEDs 300, and then to node 312. The steering diodes 314, 315, 316 and 317 are non-conducting when the LEDs 300 are powered from second circuit 140. Using the number of 20 for each string of LEDs and the approximately 3 volt rating of each LED as mentioned in the foregoing paragraph, when LEDs 300 are powered in series from second circuit 140, the voltage generated by second circuit 140 between nodes 308 and 312 is approximately 120 volts DC. Such elevated voltage, in turn, provides the fluorescent lamp electronic ballast powering the second circuit 140 an electrical load more comparable to a typical 600 mm fluorescent lamp, for example. This voltage is approximately double the voltage provided by first circuit 110.

Operation of second circuit 140 at elevated voltages reduces the current levels in second circuit 140; such reduced current levels reduce a potentially life-threatening electrical shock hazard from a person exposed to current from second circuit 140. Accordingly, in the U.S., for instance, it thus possible to meet the UL electrical shock hazard test described in UL 1598c standard and referenced UL 935 standard for the fluorescent lamp electronic ballast 122 (FIG. 3) of the instant start type or for fluorescent lamp electronic ballast 123 (FIG. 4) of the rapid start or other type, including older ballasts, which are known to operate as low as about 25 kHz. UL is also known as Underwriter's Laboratory, and is headquartered in the U.S.A. Without operating second circuit 140 at an elevated voltage, as mentioned, it is possible to meet the shock hazard test described in UL 1598c standard and referenced UL 935 standard for newer ballasts operating at about 45 kHz, but typically not possible to meet the shock hazard test for older ballasts, which, as mentioned, are known to operate as low as about 25 kHz.

Operation of second circuit 140 at elevated voltages, especially when being powered from a fluorescent lamp electronic ballast 122 (FIG. 3) of the instant start type, additionally may allow more efficient operation of the fluorescent lamp electronic ballast. Such operation of second circuit 140 at elevated voltages also allows, in various embodiments, one or more capacitors used for limiting current in the LEDs 300 to be smaller and less expensive; this advantage will be discussed below.

The following will be a matter of routine skill to persons of ordinary skill in the art from the foregoing description of FIG. 6 concerning each of the left-shown and right-shown strings of LEDs 300 in that figure: Individual ones of any LED could be replaced with two or more parallel-connected LEDs.

FIG. 7 shows an LED circuit 304 that achieves even more elevated voltages of operation of second circuit 140, to achieve greater ease in meeting an electrical shock test described below when operated from a fluorescent lamp electronic ballast and may allow more efficient operation of the fluorescent lamp electronic ballast. In various embodiments, LED circuit 304 provides electrical loads compatible with, for example, higher voltage 900 mm or 1200 mm fluorescent lamps of various wattages. Further, in various embodiments, LED circuit 304 provides a reduction in size and expense of various current-limiting capacitors, as will be discussed below while still providing low voltage parallel operation when LEDs 300 are powered from first circuit 110. LED circuit 304 contains two, preferably identical LED circuit units 326 and 327.

In LED circuit unit 326 of FIG. 7, the left-shown two strings of LEDs 300 and associated steering diodes 314, 315, 316, 317 and 320 are the same as shown in LED circuit 303 of FIG. 6. LED circuit unit 326 additionally includes steering diodes 318, 319 and 321 and an associated string of LEDs 300. When LEDs 300 are powered from first circuit 110, steering diodes 318 and 319 conduct, and steering diode 321 does not conduct, because it is reverse biased. Using the above example of each string of LEDs being 20 in number and each LED having a voltage rating of approximately 3 volts, when first circuit 110 (FIG. 5) powers the LEDs, the voltage produced by first circuit 110 across each of the strings of LEDs 300 between nodes 306 and 310 in LED circuit unit 326 is approximately 60 volts rms.

When second circuit 140 (FIG. 5) powers LEDs 300 of LED circuit unit 326 of FIG. 7, steering diodes 320 and 321 conduct current serially through each of the three strings of LEDs shown. With each string having 20 LEDs with an approximately 3 volt rating for each LED, the serial voltage across the three strings of LEDs becomes approximately 180 volts. The steering diodes 314, 315, 316, 317, 318 and 319 are non-conducting at this time. Operating second circuit 140 at an elevated voltage achieves the advantages mentioned in the two paragraphs above Operation of LED circuit unit 327 in LED circuit 304 of FIG. 7 is the same as for operation of LED circuit unit 326 just described. That is, referring to LED circuit unit 327, the steering diodes 328, 329, 330, 331, 332, 333, 334 and 335 respectively function the same as, referring to LED circuit unit 326, steering diodes 314, 315, 316, 317, 318, 319, 320 and 321. It may be desirable to exclude LED circuit unit 327 for a lower power LED lamp (e.g., approximately 9 watts), and to include LED circuit unit 327 for a higher power LED lamp (e.g., approximately 18 watts). In either case, second circuit 140 provides approximately 180 volts dc in the example given above, with 20 LEDs in each string of LEDs, and with each LED having a voltage rating of approximately 3 volts, which is more appropriate for retrofitting fluorescent lamps with lengths of 900 mm or 1200 mm.

The present inventors have discovered that when second circuit 140 powers LEDs 300 with considerably more voltage than first circuit 110, operation of second circuit 140 can cause various adverse effects. Such adverse effects include imposition on components of first circuit 110 of excessively high voltage that may exceed the voltage ratings of components of first circuit 110. Such adverse effects can cause a deleterious level of reverse leakage current through one or more steering diodes 314-321 and 328-335 in LED circuit 304 of FIG. 7. Such deleterious level of reverse current can cause LEDs 300 to not illuminate when desired, or to sporadically flash on and off or to sporadically flash brighter. This has been discovered, for instance, when the voltage from node 307 to node 311 becomes reversed biased to a deleterious level, which can lead to excessive and wanted current in components of first circuit 110 or failure of some or all LEDs 300 to Illuminate. To avoid the foregoing negative consequences, the first circuit 110 is isolated from unipolar current coming from the second circuit 140, via LEDs 300, when the second circuit 140 operates to power LEDs 300 as intended.

Preferred means to isolate first circuit 110 from unipolar current coming from second circuit 140, via LEDs 300, are either or both: (a) an interface field effect transistor (hereinafter, "FET") 337 of the n-channel type in first conductor 339 in series with first conductor 339, between node 306 and LED circuit unit 326, and (b) an interface FET 342 of the p-channel type in series with second conductor 344, between node 310 and LED circuit unit 326. FETs 337 and 342 are referred to as "interface" FETs because they interface between first circuit 110 and LEDs 300. Interface FETs 337 and 342 are respectively biased by bias circuits 340 and 345 to cause conduction through these FETs at dc or approximately dc frequency when the voltage across nodes 306 and 310 reaches an intended voltage for powering LEDs 300, and to otherwise maintain non-conduction at dc or approximately dc frequency through these FETs. In the example mentioned above for LEDs 300 of FIG. 7, the intended voltage for powering LEDs 300 is approximately 60 volts. Making bias circuits 340 and 345 that sense voltage within first circuit 110 will be routine to persons of ordinary skill in the art based on the foregoing criterion.

FETs 337 and 342 typically have body diodes that allow current at all frequencies to pass in one direction. Such body diodes for FETs 337 and 342 are shown as diodes 338 and 343, respectively, and are preferably oriented to achieve the following goals when the diodes 338 and 343 are in a non-conducting state: Prevent second circuit 140 from imposing a voltage from node 306 to node 310 that is higher than a rated output voltage of first circuit 110 from node 306 to node 310 (e.g., approximately 60 volts in the example mentioned above); and to prevent second circuit 140 from imposing a voltage from node 306 to node 310 that is negative in value. However, because the body diodes 338 and 343 allow unidirectional conduction from an AC source, it is desirable for FETs 337 and 342 to bidirectionally conduct current at the frequency of fluorescent lamp electronic ballast 122 or 123 shown in FIGS. 3 and 4, respectively (hereinafter, "ballast frequency"), typically about 45 kHz and more broadly typically in the range from 20 KHz to 100 KHz. This is for the purpose of limiting the charging of capacitors within first circuit 110, which could cause LEDs 300 to sporadically flash on and off or to sporadically flash brighter, and for the purpose of preventing one-way conduction of AC current that could result in charge buildup and deleterious high voltage. For this purpose, a bypass capacitor 341 is preferably provided across interface FET 337, and a bypass capacitor 346 is preferably provided across interface FET 342. This allows bidirectional conduction of current at the above-defined ballast frequency across the FETs 337 and 342, for the purpose mentioned earlier in this paragraph. Similar bypass capacitors (not shown) can be used to bypass current at the ballast frequency across FETs, diodes or similar devices that would otherwise unidirectionally block conduction of current at the ballast frequency.

The present inventors have discovered that, in some embodiments, it is desirable to have the foregoing isolating means both in series with the first conductor 339 and in series with the second conductor 344; this is to prevent leakage of current from first circuit 110 to LEDs 300 during intended powering of those LEDs by second circuit 140 that can give rise to flickering of LEDs 300. However, in other embodiments, for instance, where any sporadic flashing on and off and any sporadic flashing brighter of LEDs is negligible, first circuit 110 can be isolated from LEDs 300 by only one isolating means in either first conductor 339 or second conductor 344.

A variation of the foregoing isolating means in LED circuit 304 includes replacing n-channel FET 337 with a p-channel FET, a bipolar junction transistor or a silicon controlled rectifier, or with a mechanical switch. Another variation is to similarly replace p-channel FET 342 with an n-channel FET, a bipolar junction transistor, a silicon controlled rectifier or a mechanical switch.

It will be a matter of routine skill to persons of ordinary skill in the art, from comparing the descriptions of LED circuits 303 and 304 of FIGS. 6 and 7, that one or more additional strings of LEDs 300, such as the string of LEDs 300 associated with steering diodes 318, 319 and 321, can be added to each of LED circuit units 326 and 327. This further elevates the voltage provided by second circuit 140 to the LEDs across nodes 308 and 312, while maintaining the same voltage provided by first circuit 110 across nodes 306 and 310.

One or more additional LED circuit units, such as LED circuit unit 327, can be added to LED circuit 304 of FIG. 7. This allows a longer (e.g., 1500 mm, 1800 mm, 2400 mm or even longer) fluorescent lamp to be efficiently retrofit, and also allows a more dense distribution of lower cost LEDs in an LED lamp to obtain a more uniform light distribution.

Referring again to FIG. 5, circuitry 200 includes first conduction control means 350 and second conduction control means 370, whose functions include permitting independent operation of the first and second circuits 110 and 140. First conduction control means 350 and second conduction control means 370 may also be used to mitigate potentially life-threatening electrical shocks when an LED lamp is inserted into a fluorescent lamp fixture that has a power connector receptacle (not shown) supplying mains power to a power pin of the lamp.

When using fluorescent lamp fixture 100 or 115 of FIGS. 1 and 2, respectively, in which power source 109 supplies power over power mains directly to first and second power pins 104 and 106, first circuit 110 conditions the power for driving LEDs 300. First circuit 110 includes an LED power supply as shown in FIGS. 1 and 2. Both non-isolated and electrically isolated power supplies are contemplated for first circuit 110.

Figure 8:
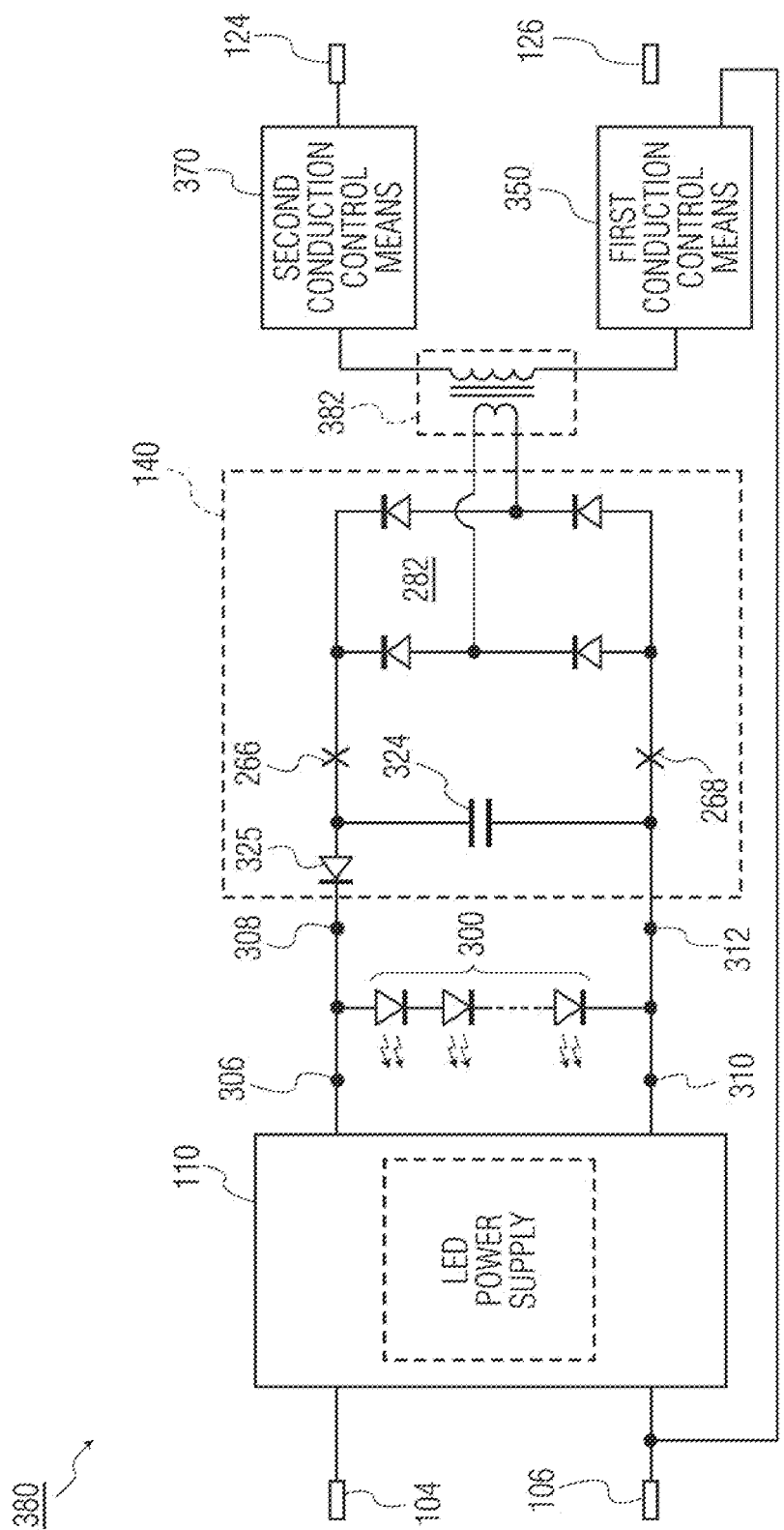
FIG. 8 is similar to FIG. 5 except for inclusion of an isolation transformer operating at a ballast frequency between a second circuit and first and second conduction control means.

FIG. 8 shows circuitry 380 that is similar to circuitry 200 of FIG. 5, except for inclusion of an isolation transformer 382 operating at the ballast frequency, as defined above, between rectifier circuit 282 of second circuit 140 and first and second conduction control means 350 and 370. Selection of the winding turns ratio for transformer 382 provides an alternative way to achieve the exemplary voltage levels discussed above with regard to LED circuit 304 of FIG. 7. Thus, by setting the winding turns ratio of transformer 382, from right to left in FIG. 8, at 3:1, first and second circuits 110 and 140 can both power LEDs 300 at approximately 60 volts. However, with such winding turns ratio, either of the fluorescent lamp electronic ballast 122 of FIG. 3 or the fluorescent lamp electronic ballast 123 of FIG. 4 will provide approximately 180 volts to transformer 382, and, like the embodiments of FIGS. 6 and 7, achieves greater ease of meeting an electrical shock test and greater efficiency discussed above in relation to FIGS. 6 and 7. This embodiment avoids the need to use isolating means, such as interface FETs 337 and 342 of FIG. 7, for isolating first circuit 110 from unipolar current coming from LEDs 300 when those LEDs are being powered as intended by second circuit 140. Adjustment of the winding turns ratio of isolation transformer 382, for example, selecting 2.8:1 rather than 3:1, may allow a circuit designer to make the embodiment more efficient, or safer, for instance. On the other hand, transformers typically occupy more space than the mentioned isolating means used in the FIG. 7 embodiment.

LEDs 300 in circuitry 380 of FIG. 8 may beneficially include a plurality of parallel strings of LEDs in addition to the single string of LEDs shown. The use of more parallel strings of LEDs will provide appropriate light as the length of an LED lamp 102 increases.

Figure 9:
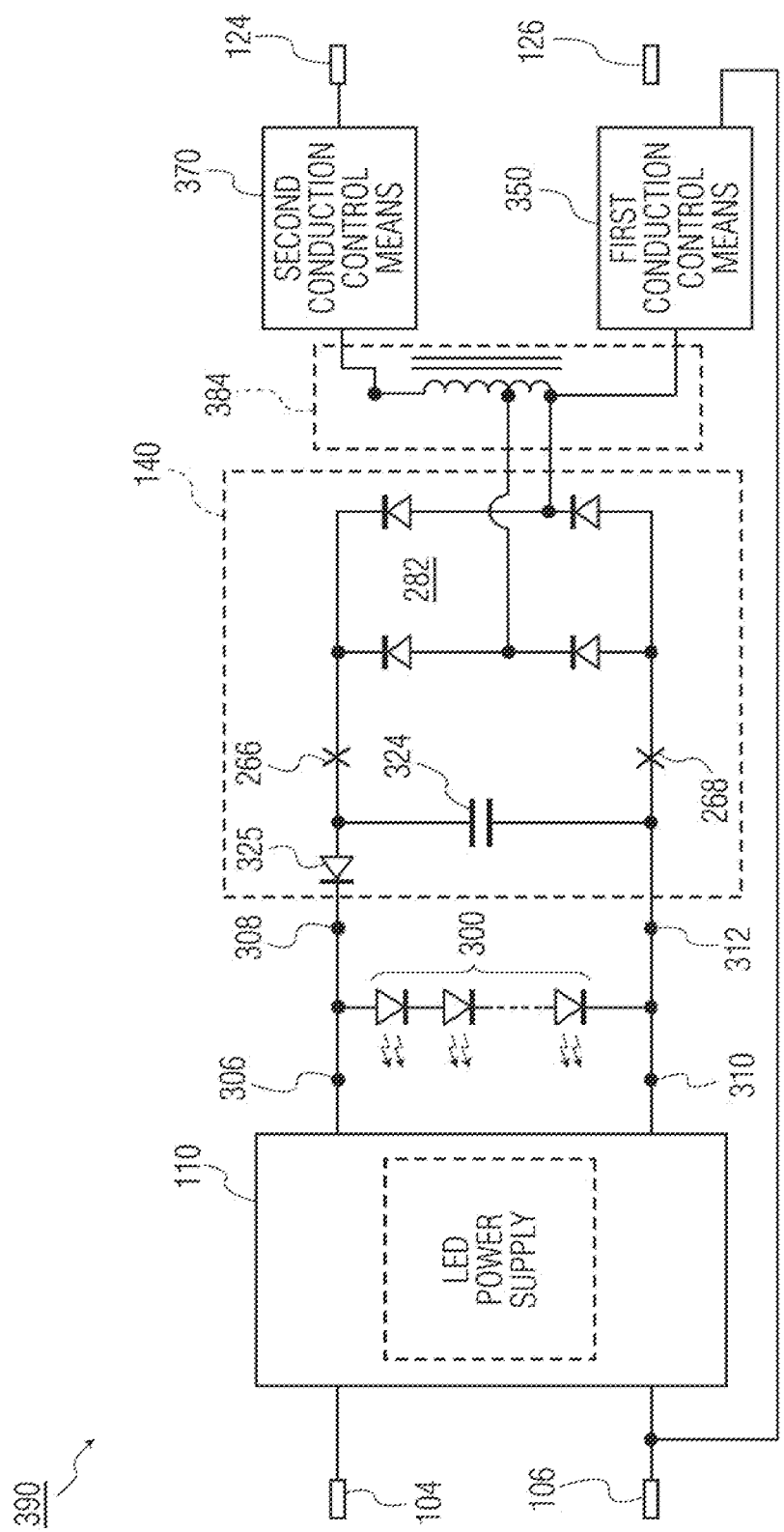
FIG. 9 is similar to FIG. 8 except for inclusion of an autotransformer operating at a ballast frequency between a second circuit and first and second conduction control means.

FIG. 9 show circuitry 390 that is similar to circuitry 380 of FIG. 8, except for replacing isolation transformer 382 (FIG. 8) with an autotransformer 392. A conductor 394, at the base of autotransformer 392, provides a galvanic circuit path from rectifier circuit 282 of second circuit 140 to first conduction control means 350; on the other hand, compared to an isolation transformer (e.g., 382, FIG. 8) of similar capacity, autotransformers are typically more efficient, smaller, simpler to construct, and less costly. Selection of the winding turns ratio for transformer 392 provides an alternative way to achieve the exemplary voltage levels discussed above with regard to LED circuit 304 of FIG. 7. Thus, by setting the winding turns ratio of transformer 392, from right to left in FIG. 9, at 3:1, first and second circuits 110 and 140 can both power LEDs 300 at approximately 60 volts. However, with such winding turns ratio, either of the fluorescent lamp electronic ballast 122 of FIG. 3 or the fluorescent lamp electronic ballast 123 of FIG. 4 will provide approximately 180 volts to transformer 382, and, like the embodiments of FIGS. 6 and 7, achieves greater ease of meeting an electrical shock test when operated from a fluorescent lamp electronic ballast and may allow greater efficiency in operation, as discussed above in relation to FIGS. 6 and 7. This embodiment avoids the need to use isolating means, such as interface FETs 337 and 342 of FIG. 7, for isolating first circuit 110 from unipolar current coming from LEDs 300 when those LEDs are being powered as intended by second circuit 140. Adjustment of the winding turns ratio of autotransformer 392, for example, selecting 2.8:1 rather than 3:1, may allow a circuit designer to make the embodiment more efficient, or safer, for instance.

LEDs 300 in circuitry 390 of FIG. 9 may beneficially include a plurality of parallel strings of LEDs in addition to the single string of LEDs shown. The use of more parallel strings of LEDs will provide appropriate light as the length of an LED lamp 102 increases.

Figure 10:
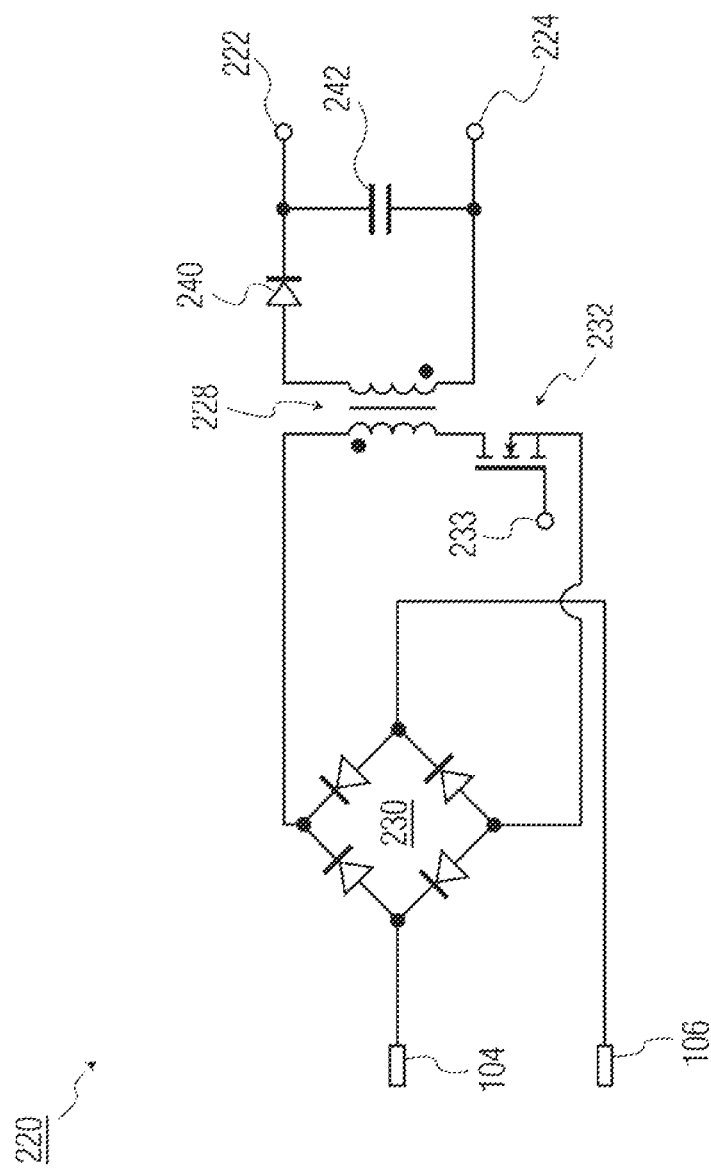
FIG. 10 is an electrical schematic diagram of an LED power supply including a high frequency isolating transformer between electrical inputs and electrical outputs.

FIG. 10 shows a typical isolated LED power supply 220 of first circuit 110 for LED lamp 102 (FIGS. 1-4), which receives mains power on first and second power pins 104 and 106, and supplies conditioned power on outputs 222 and 224 to LEDs 300 of FIG. 5. Power supply 220, known as an offline, isolated flyback LED driver circuit, includes an isolation transformer 228. By "isolation" is meant sufficiently limiting conduction through the transformer at the power mains frequency to less than 10 milliamps. Isolation transformer 228 typically operates at the ballast frequency, as defined above. The foregoing constraint qualifies the type of isolation transformer to which reference is made herein. The foregoing power supply 220 includes a conventional full-wave rectifier circuit 230, a FET 232, an output flyback diode 240 and capacitor 242. FET 232 is controlled in a known manner by a signal applied to its gate 233.

The use of isolation transformer 228 in FIG. 10 assists in reducing an electric shock hazard when operating the LED lamp 102 in either of fluorescent lamp fixtures 100 (FIG. 1) or 115 (FIG. 2), powered by first circuit 110. This is accomplished because isolation transformer 228 provides, in FIG. 5, for instance, galvanic isolation between first and second power pins 104 and 106 and first and second conduction control means 350 and 370. Similarly, in FIG. 8, isolation transformer 382 achieves galvanic isolation in the same manner as described in the foregoing sentence for isolation transformer 228 in FIG. 10.

A preferred alternative exists to using the serial and parallel connected LEDs of FIGS. 6 and 7 or to the use of isolation transformer 382 of FIG. 8 or the autotransformer of FIG. 9 to make the second circuit 140 drive LEDs 300 at a higher voltage than first circuit 110. The preferred alternative is to configure first circuit 110 to drive LEDs 300 at approximately the same voltage as for second circuit 140. The preferred alternative circuit can be realized with routine skill in the art. For instance, the isolation transformer 228 in the isolated power supply 220 of FIG. 10 can be configured to have a winding turns ratio that increases the voltage on the transformer secondary winding connected to outputs 222 and 224. Specifically, the foregoing winding turns ratio can be selected so that first circuit 110 drives LEDs 300 with approximately the same voltage as does second circuit 140. With respect to the embodiments of FIGS. 6 and 7, this preferred alternative embodiment avoids the need to use the steering diodes (e.g., 314 and 316) and the isolating means, such as interface FETs 337 and 342 of FIG. 7, for the above-described purposes. With respect to the embodiments of FIGS. 8 and 9, the preferred alternative embodiment avoids the needs to use the transformers shown in those figures.

Figure 11:
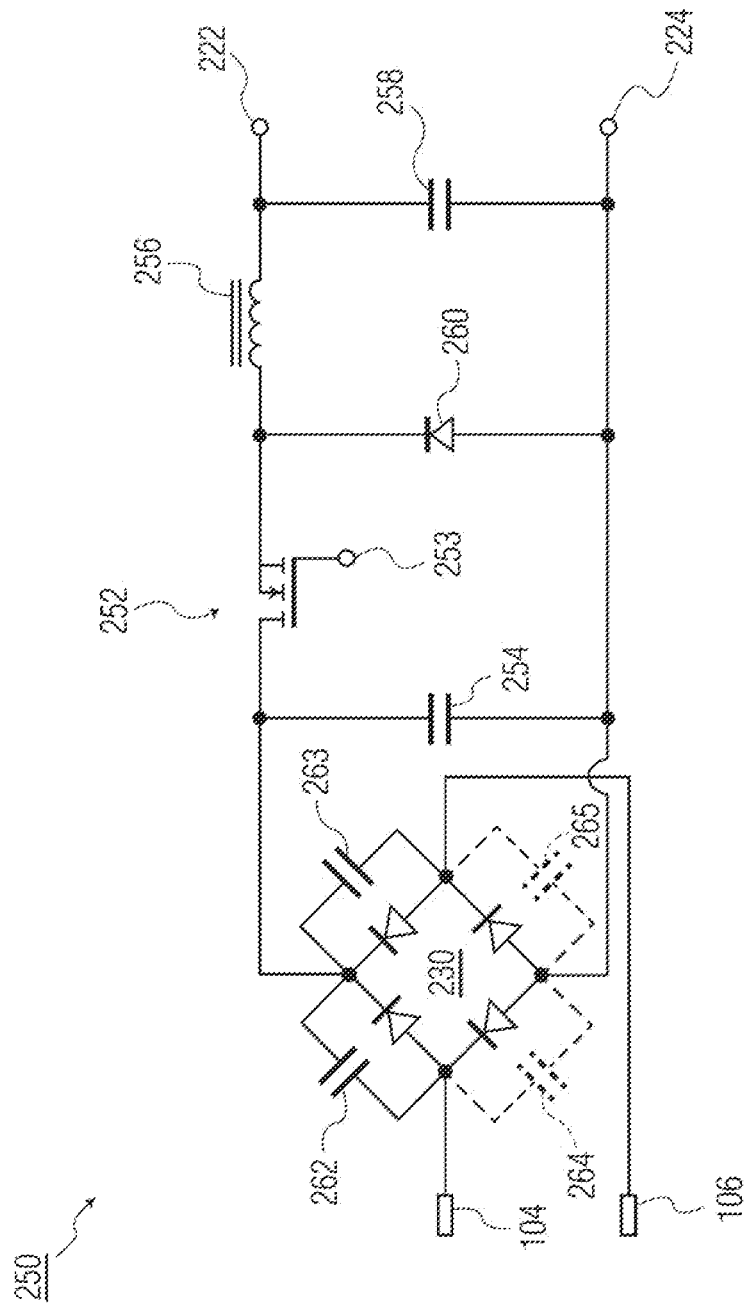
FIG. 11 is an electrical schematic diagram of an LED power supply that does not include means for isolating electrical outputs from electrical inputs.

FIG. 11 shows a typical non-isolated LED power supply 250 of first circuit 110 for LED lamp 102 (FIGS. 1-4) that receives power from power mains via first and second power pins 104 and 106, and supplies conditioned power on outputs 222 and 224 to LEDs 300 of FIG. 5. Power supply 250, known as a basic offline buck LED driver circuit, includes a conventional full-wave rectifier circuit 230, a FET 252, and cooperating capacitor 254, inductor 256, and capacitor 258. Diode 260 is a high speed recovery diode. FET 252 is controlled by a signal provided to its gate 253 in a known manner.

Bypass capacitors 262 and 263 are shown connected across selected diodes of full-wave rectifier circuit 230 to permit flow of current at the ballast frequency, as defined above to limit the charging of capacitors, such as capacitors 254 and 258, in first circuit 110 when second circuit 140 powers the LEDs. Such charging of capacitors could cause sporadic flashing on and off or sporadic flashing brighter of LEDs 300. An alternative to using bypass capacitors 262 and 263 is to use instead bypass capacitors 264 and 265, shown in phantom. Another alternative to using alternative to using bypass capacitors 262 and 263 is to use instead bypass capacitors 262 and 264, or to use instead bypass capacitors 264 and 265.

Additionally, it may be desirable to use all four capacitors 262, 263, 264 and 265, which may be desirable for some types of fluorescent lamp electronic ballasts 122 or 123 of FIGS. 1 and 2, respectively. The foregoing configuration of capacitors can, for instance, reduce asymmetry in common mode conduction across the associated diodes that could cause deleterious behavior of first circuit 110.

The foregoing LED power supplies 220 and 250 of FIGS. 10 and 11 are shown in basic form, and are representative of isolating and non-isolating LED power supplies. Many other suitable configurations for isolating and non-isolating LED power supplies will be apparent to persons of ordinary skill in the art. Examples of other suitable isolated power supplies that can be used are a basic flyback circuit, a boost plus flyback circuit, a buck-boost circuit with added isolation, or a forward converter. Examples of other suitable non-isolating power supplies that can be used are buck-boost circuit, a boost circuit, a Cuk circuit, or a single-ended primary inductor converter (SEPIC) circuit.

As shown in FIGS. 10 and 11, both isolating and non-isolating LED power supplies 220 and 250 typically include an active electrical component of a FET 232 or 252, for instance. As such, LED power supplies 220 and 250 may comprise active circuits, as defined above.

Returning to circuitry 200 of FIG. 5, second circuit 140 may typically be a simple, passive circuit as defined above. In the embodiment shown, second circuit 140 includes a rectifier circuit 282 formed from a full-wave diode bridge, for instance. Rectifier circuit 282 can be formed with many other topologies, such as a half-wave bridge or a voltage doubler.

Various benefits result from using first and second circuits 110 and 140 (FIG. 5) that are respectively dedicated to direct mains power operation and operation from an existing fluorescent lamp ballast associated with a lamp fixture. In addition to the benefits of energy efficiency and economy mentioned in the Summary of the Invention above, a lamp installer has more options when installing an LED lamp. For instance, in a school building, an installer can decide to rewire fluorescent lamp ballasts in a classroom for use directly from the power mains, to increase efficiency of converting electricity to light. In other locations in the same building, the installer may decide that it would be more economical overall to operate the lamps from existing fluorescent lamp ballasts, for example, in a closet or for emergency lighting in a stairwell. This is because the light fixtures in such locations may be used only occasionally, and it would be more costly to rewire the light fixtures in those locations than to use existing fluorescent lamp electronic ballasts. Additionally, if a fluorescent lamp ballast fails in operation, the fixture containing such ballast can be rewired to operate the same lamp directly from power mains.

Further, it is preferable that the first and second circuits 110 and 140 (FIG. 5) are respectively active and passive circuits, as those terms are defined herein, so as to allow higher efficiency, as mentioned, and a broader range of stable operation. In particular, each circuit can be optimized to work most efficiently with its respective power source.

Figure 12:
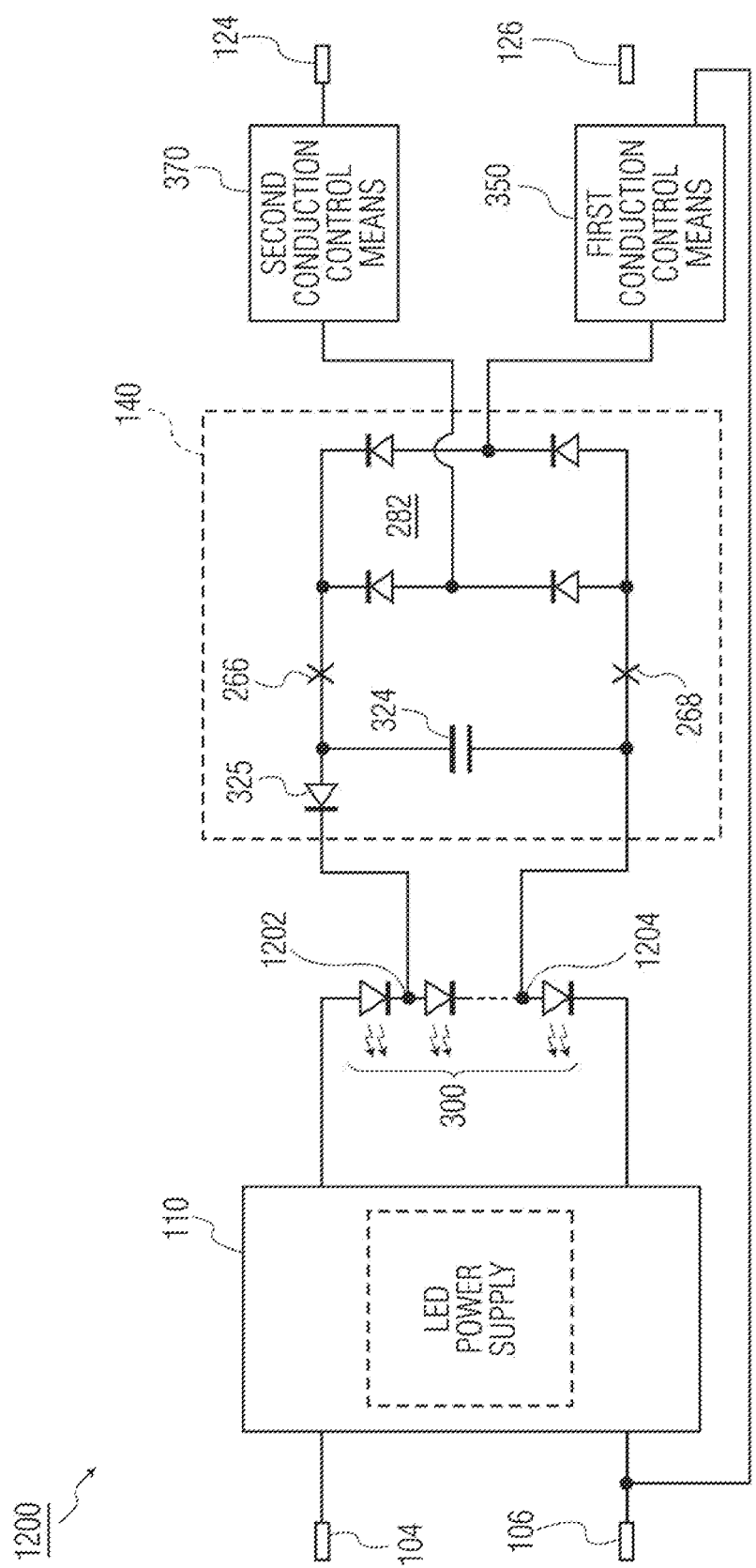
FIGS. 12, 13 and 14 are electrical schematic diagrams of circuitries within the LED lamp shown in FIGS. 1-4 that are alternative to that shown in FIG. 5.

FIG. 12 shows an alternative circuitry 1200 within LED lamp 102 of above-described FIGS. 1-4. Circuitry 1200 shares components with circuitry 200 of FIG. 5 that have the same reference numerals. The main difference is that second circuit 140 is used to power only a portion of LEDs that are accessed via nodes 1202 and 1204. Node 1202 can be at other locations, such as at the top of LEDs 300. Similarly, node 1204 can be at other locations, such as at the bottom of LEDs 300. In the implementation of first circuit 110 using isolated LED power supply 220 of FIG. 10 or the non-isolated LED power supply 250 of FIG. 11, the value of capacitor 242 (FIG. 10) or capacitor 258 (FIG. 11) should be chosen as follows. The value of the foregoing capacitors 242 or 258 should be chosen in association with the value of electrolytic capacitor 324 of FIG. 12 to provide sufficient energy storage at the LED operating frequency to result in acceptably low light flicker levels.

By having second circuit 140 power only a portion of the LEDs 300 powered by first circuit 110, the circuit designer has a greater degree of design choice to optimize one or both first and second circuits 110 and 140.

Figure 13:
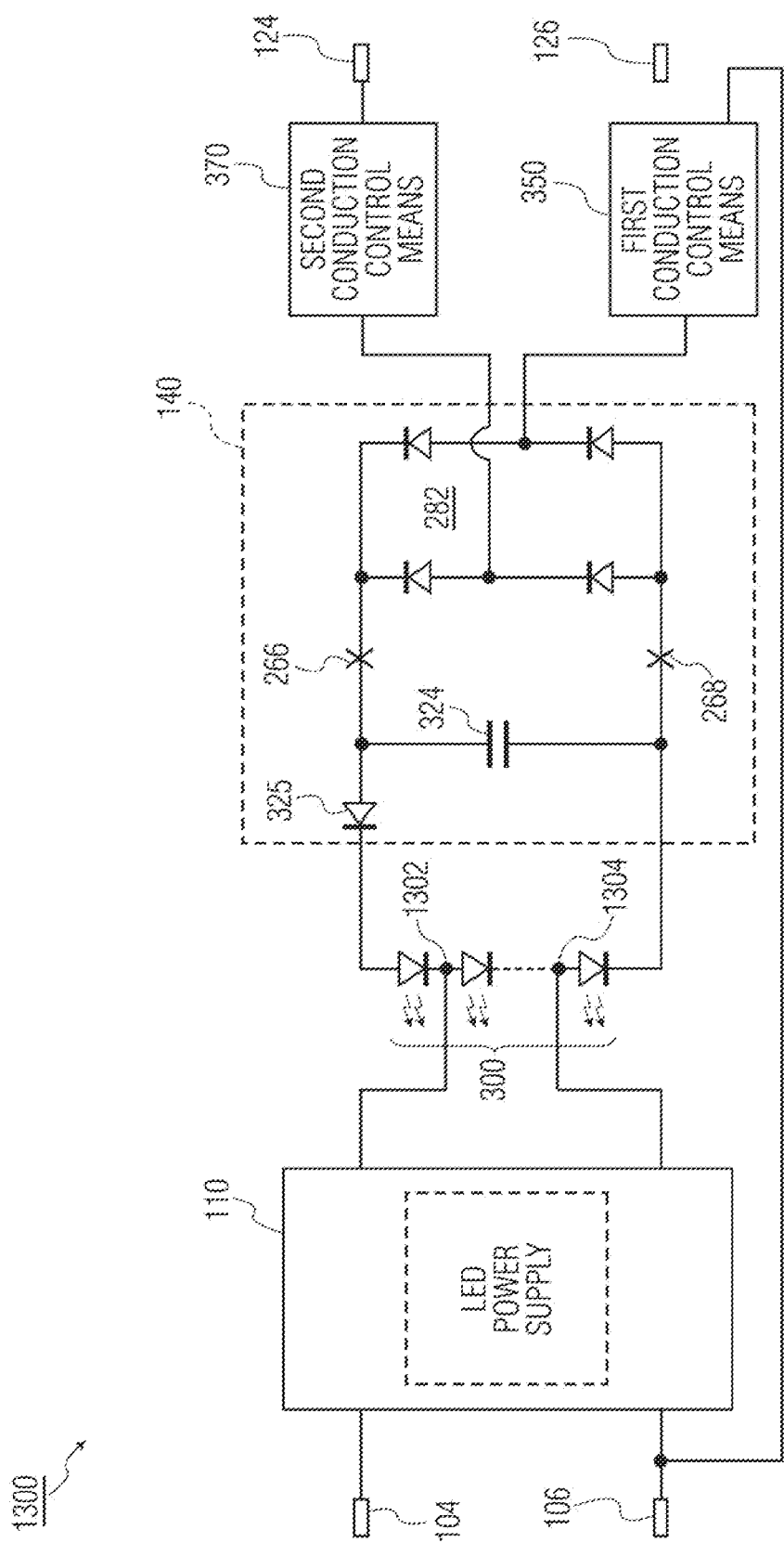

FIG. 13 shows a further alternative circuitry 1300 within LED lamp 102 of above-described FIGS. 1-4. Circuitry 1300 shares components with circuitry 200 of FIG. 5 that have the same reference numerals. The main difference is that first circuit 110 is used to power only a portion of LEDs that are accessed via nodes 1302 and 1304. Node 1302 can be at other locations, such as at the top of LEDs 300. Similarly, node 1304 can be at other locations, such as at the bottom of LEDs 300. In the implementation of first circuit 110 using isolated LED power supply 220 of FIG. 10 or the non-isolated LED power supply 250 of FIG. 11, the value of capacitor 242 (FIG. 10) or capacitor 258 (FIG. 11) should be chosen as follows. The value of the foregoing capacitors 242 or 258 should be chosen in association with the value of electrolytic capacitor 324 of FIG. 13 to provide sufficient energy storage at the LED operating frequency to result in acceptably low light flicker levels.

By having first circuit 110 power only a portion of the LEDs 300 powered by second circuit 140, the circuit designer has a greater degree of design choice to optimize one or both first and second circuits 110 and 140. For instance, it becomes easier to limit current to LEDs 300 when using a fluorescent lamp electronic ballast 122 (FIG. 3) of the instant start type. This is because the voltage applied to the all the LEDs 300 from second circuit 140 can be higher than the voltage applied to the LEDs 300 between nodes 1202 and 1204 from first circuit 110.

As with first circuit 110 of FIG. 5, first circuit 110 of FIGS. 11 and 12 can be realized as either isolated LED power supply 220 of FIG. 10 or non-isolated LED power supply 250 of FIG. 11, by way of example.

Figure 14:
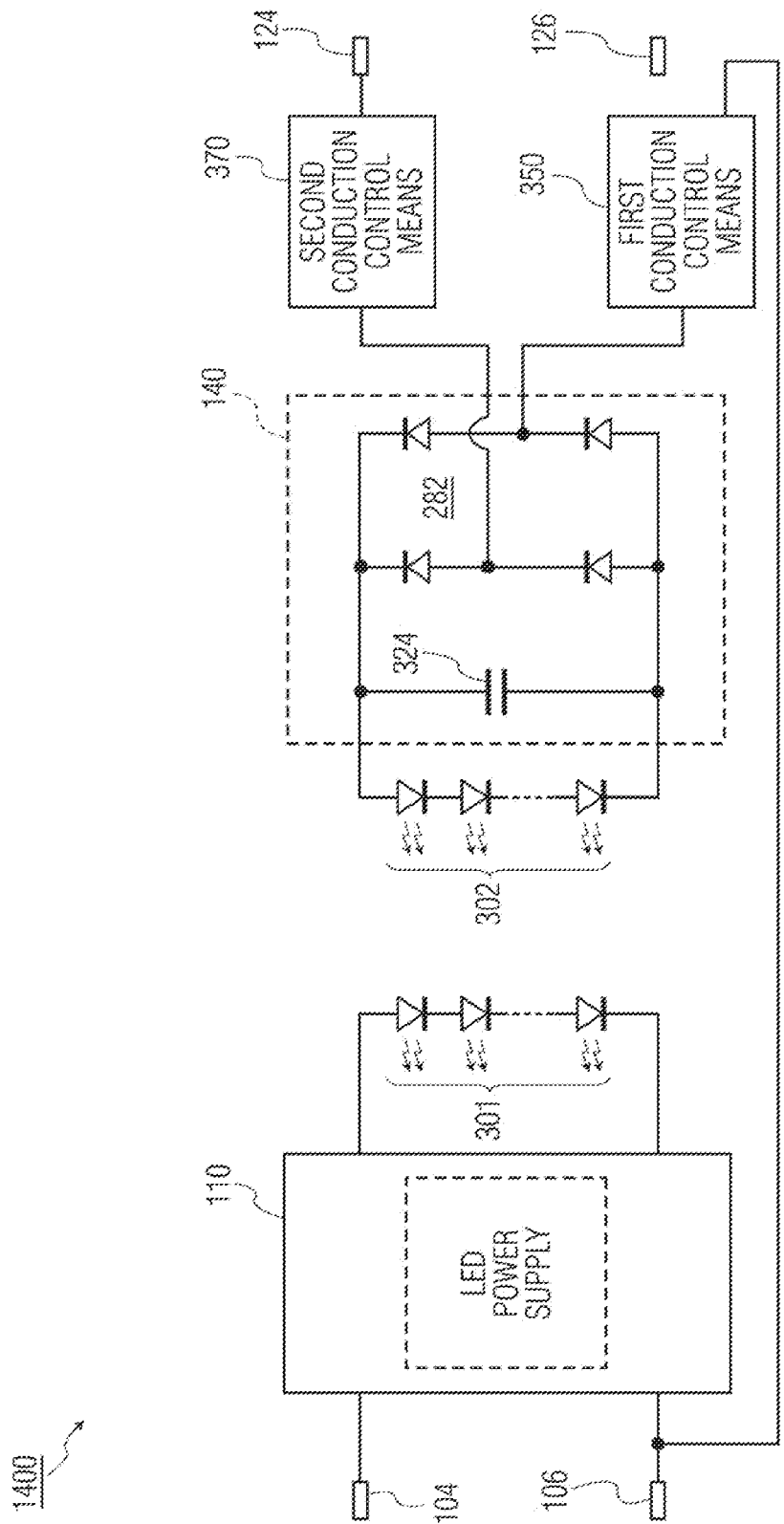

FIG. 14 shows still further alternative circuitry 1400 within LED lamp 102 of above-described FIGS. 1-4. Circuitry 1400 shares components with circuitry 200 of FIGS. 5, 12 and 13 that have the same reference numerals. The main difference is that, rather than having LEDs 300 powered by both first and second circuits 110 and 140, first circuit 110 exclusively powers LEDs 301 and second circuit 140 exclusively powers LEDs 302. The variations of arrangements of LEDs 300 described above apply as well to LEDs 301 and 302. This entirely eliminates the above-mentioned concern mains of power passing through second circuit 140 and interfering with the intended operation of first circuit 110 when the first circuit is connected to mains power via first and second power pins 104 and 106.

By having first circuit 110 of FIG. 14 power LEDs 301 and second circuit 140 power different LEDs 302, the circuit designer has a greater degree of design choice to optimize one or both first and second circuits 110 and 140. For instance, it becomes easier to limit current to LEDs 302 when using a fluorescent lamp electronic ballast 122 (FIG. 3) of the instant start type. This is because the voltage applied to LEDs 302 from second circuit 140 can be higher than the voltage applied to LEDs 301 from first circuit 110.

Possible First Conduction Control Means Functions

Referring to FIGS. 5, 8-9 and 12-14 first conduction control means 350 preferably performs one or more of the following functions:

(1) PERMIT SECOND CIRCUIT OPERATION. First conduction control means 350 may be realized as a capacitor, for instance, for conducting power at the ballast frequency, as defined above. By "permit" second circuit operation is meant herein to provide necessary, but not sufficient, means to allow second circuit 140 to operate. In addition, the second conduction control means 370 also needs to permit second circuit operation. In other words, both first and second conduction control means 350 and 370 are necessary, and together are sufficient to enable operation of second circuit 140.

(2) PERMIT SECOND CIRCUIT TO OPERATE WITHOUT INTERFERING WITH FIRST CIRCUIT. First conduction control means 350 also may perform the function of permitting second circuit 140 to operate without interfering with first circuit 110 during intended operation of first circuit 110; that is, when the first circuit is connected to mains power via first and second power pins 104 and 106. To realize this function, conduction control means 350 is configured as a capacitor or a switch situated in the open position, for instance, to limit conduction of current from the mains to LEDs 300 via second power pin 106 and rectifier circuit 282 of second circuit 140 when first circuit 110 is operating. Such limitation of current from the mains prevents first or second substantial types of deviation of light from LEDs 300 compared to the average luminous intensity of such LEDs that would arise from first circuit 110 being standalone. First circuit 110 would be standalone if imaginary cuts 266 and 268 were made to the circuitry of FIGS. 5, 12 and 13. The following first and second types of deviation of light are contemplated:

(1) Flicker-type deviation of light from LEDs 300 in the frequency range of 0.1 Hz to 200 Hz; and
(2) Continuous-type deviation of light from LEDs 300.

A first substantial level of deviation of light of the flicker-type and the continuous-type is 10 percent. A second substantial level of deviation of light of the flicker-type and continuous-type is 5 percent for minimizing annoying flicker-type and continuous-type deviation. Measurement of luminous intensity for purposes of calculating light flicker is well known, and may utilize a photocell to constantly measure light from a light source.

(3) LIMIT CURRENT FOR DRIVING LEDs. First conduction control means 350 may further limit current as appropriate for driving LEDs 300. First conduction control means 350 can accomplish this function when realized as a capacitor, which presents much larger impedance at mains power frequency than at the ballast frequency, as defined above. The mains power frequency is much lower than the ballast frequency, which follows from the fact that the mains frequency is in the range from zero to 500 Hz whereas the ballast frequency is typically from 20 kHz and up.

Figure 15:
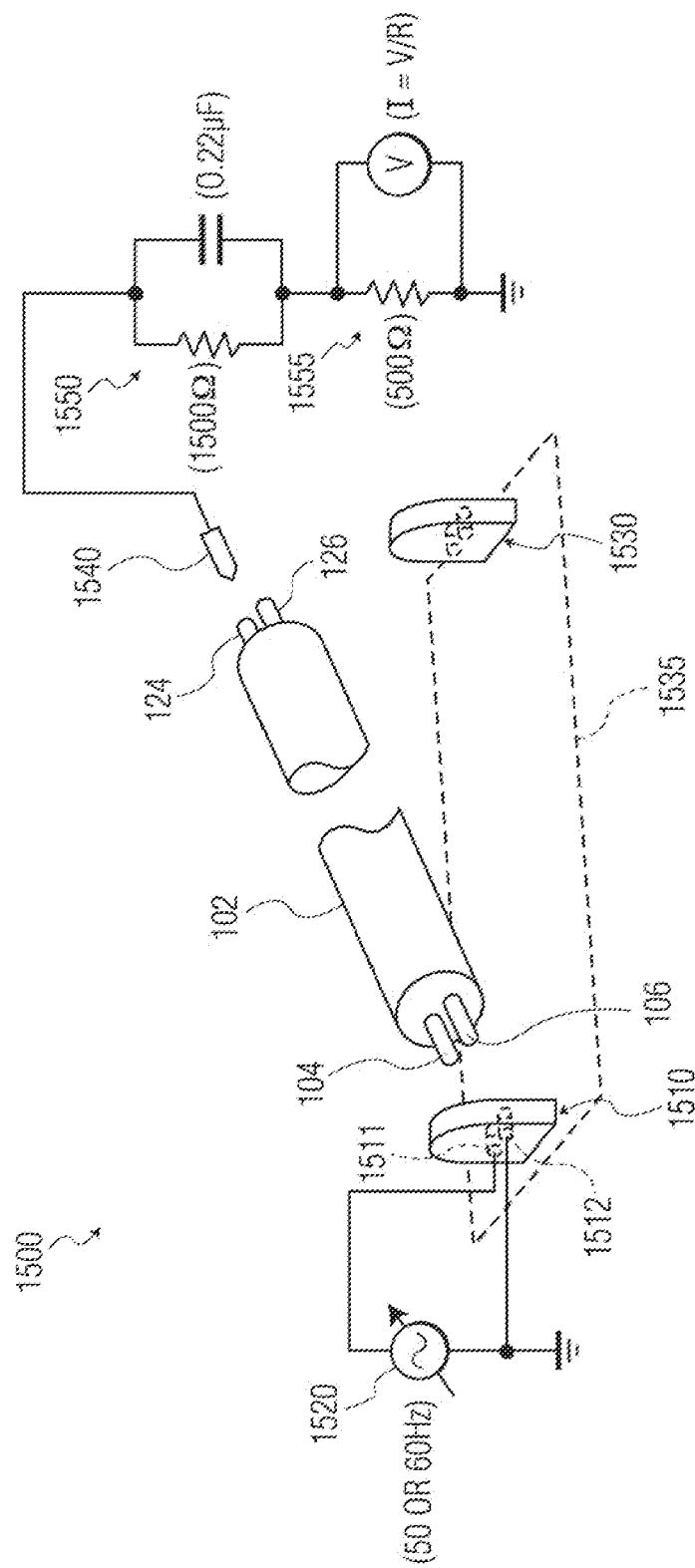
FIG. 15 is partially in perspective and partially in electrical schematic diagram of an arrangement for an electrical shock hazard test involving an LED lamp.

(4) PERMIT ATTAINMENT OF SHOCK HAZARD PROTECTION. A fourth possible function of first conduction control means 350 (and also of cooperating second conduction means 370) is to permit the mitigation of a potentially life-threatening electrical shock hazard from the mains when such a lamp 102 (FIGS. 1-2) is inserted into a fluorescent lamp fixture (e.g., 100, 115) of FIGS. 1-2 by an installer. FIG. 15 shows an arrangement 1500 for an electrical shock hazard test for an LED lamp 102, similar to the arrangement described in UL 1583c standard and referenced UL 935 standard for conducting such tests. Lamp 102 has first and second power pins 104 and 106 at one end of the lamp, and third and fourth power pins 124 and 126 at an opposite end of the lamp. A lampholder 1510 for a bi-pin linear fluorescent lamp, contains first and second power contacts 1511 and 1512. Alternatively, each power contact 1511 and 1512 could simply be an electrical clip that can attach to any of the power pins 104, 106, 124 and 126. First power contact 1511 of lampholder 1510 is connected to a voltage source 1520 for AC voltage corresponding to the intended mains line voltage. Voltage source 1520 may provide a range of voltages, which is indicated by an arrow in the symbol for voltage source 1520. Second power contact 1512 of lampholder 1510 is connected to the mains line neutral of voltage source 1520, which is also connected to earth ground. Another lampholder 1530 may be present on apparatus 1535 that contains lampholder 1510, but is not used in the present test. Tests are conducted at the intended mains line voltage and frequency for powering the first circuit 110. For LED retrofit lamps, this typically corresponds to a range of voltage from voltage source 1520 voltage from 110 VAC RMS to 277 VAC RMS and line frequencies of 50 or 60 Hz. Testing could be performed at a fixed voltage, conforming to a single intended mains source voltage, if desired. It would be routine for persons of ordinary skill in the art to understand other intended mains source voltages, such as 347 VAC RMS or 480 VAC RMS. It is simply a matter of ascertaining the mains source voltage to be used for any particular installation of an LED lamp 102.

In the shock hazard test, the first and second conduction control means 350 and 370 can each be embodied as one of a capacitor, or a switch situated in the open position, that is configured, for each exposed power pin 104, 106, 124 and 126 of LED lamp 102, to prevent current conduction (I=V/R, FIG. 15) at the mains frequency in an amount exceeding a predetermined RMS milliamps value, over any intended source voltage range, and at 50 Hz and at 60 Hz when measured through a circuit connected directly between the foregoing each exposed power pin, via electrical probe 1540, and earth ground and consisting of first and second serially connected components 1550 and 1555, the first component 1550 consisting of the parallel combination of a non-inductive 1500 ohm resistor and a 0.22 microfarad capacitor and the second component 1555 consisting of a non-inductive 500 ohm resistor, for each of the following situations:

(1) the first and second power pins 104 and 106 are inserted into lampholder 1510 so as to connect first power pin 104 to power contact 1511 and second power pin 106 to power contact 1512, probe 1540 being connected to third power pin 124;
(2) the first and second power pins 104 and 106 are inserted into lampholder 1510 so as to connect first power pin 104 to first power contact 1511 and second power pin 106 to second power contact 1512, probe 1540 being connected to fourth power pin 126;
(3) the third and fourth power pins 124 and 126 are inserted into lampholder 1510 so as to connect third power pin 124 to first power contact 1511 and fourth power pin 126 to second power contact 1512, probe 1540 being connected to first power pin 104;
(4) the third and fourth power pins 124 and 126 are inserted into lampholder 1510 so as to connect the third power pin 124 to the first power contact 1511 and the fourth power pin 126 to the second power contact 1512, probe 1540 being connected to the second power pin 106;
(5) the first and second power pins 106 and 104 are inserted into lampholder 1510 so as to connect the second power pin 106 to the first power contact 1511 and the first power pin 104 to the second power contact, the probe being connected to the third power pin 124;

(6) the first and second power pins 106 and 104 are inserted into lampholder 1510 so as to connect the second power pin 106 to the first power contact 1511 and the first power pin 104 to the second power contact 1512, probe 1540 being connected to the fourth power pin 126;

(7) the fourth and third power pins 126 and 124 are inserted into lampholder 1510 so as to connect the second power pin 126 to the first power contact 511 and the third power pin 124 to the second power contact 1512, probe 1540 being connected to the first power pin 104; and (8) the fourth and third power pins 126 and 124 are inserted into lampholder 1510 so as to connecting fourth power pin 126 to the first power contact 1511 and the third power pin 124 to the second power contact 1512, probe 1540 being connected to the second power pin 106.

When a capacitor is used to realize either of both of first and second conduction control means 350 and 370, the value of the capacitor(s) can be beneficially chosen to further limit the current as described in the above paragraph and also in the below paragraph, both of which start with the phrase: "(2) LIMIT CURRENT FOR DRIVING LEDs."

The maximum predetermined RMS milliamps value can be 10 at 50 Hz and at 60 Hz for any value of voltage over the mentioned range of source voltage, for instance, from 110 VAC RMS to 277 VAC RMS. The maximum predetermined RMS milliamps value is preferably even a lower value, such as S at 50 Hz and 60 Hz. The significance of these values is explained in relation to the following table:

| Bodily effect | Gender | 60 Hz AC | 10 kHz AC |
|---|---|---|---|
| Slight sensation at point(s) of contact | Men | 0.4 mA | 7 mA |
| | Women | 0.3 mA | 5 mA |
| Threshold of bodily perception | Men | 1.1 mA | 12 mA |
| | Women | 0.7 mA | 8 mA |
| Pain with voluntary muscle control maintained | Men | 9 mA | 55 mA |
| | Women | 6 mA | 37 mA |
| Pain, with loss of voluntary muscle control | Men | 16 mA | 75 mA |
| | Women | 10.5 mA | 50 mA |
| Severe pain, difficulty breathing | Men | 23 mA | 94 mA |
| | Women | 15 mA | 63 mA |
| Possible heart fibrillation after three seconds | Men | 100 mA | |
| | Women | 100 mA | |

The foregoing data was compiled by Charles Dalziel, a major researcher in the U.S.A. on the effect of electric currents in the human body, and relate to human test subjects in good health. The electrical circuitry described in the foregoing paragraph is used by UL, which is also known as Underwriter's Laboratory, to emulate the hand of a human being that touches exposed conductive circuitry of an LED lamp, and a path through the human being to earth ground. The predetermined rms milliamp value of 10 is somewhat lower than the threshold that would cause "[p]ain with loss of voluntary muscle control" for women, with the 0.5 milliamp rms difference providing a margin of safety. The comparable threshold for men is even higher (i.e., 16 milliamps rms). Loss of voluntary muscle control is dangerous because it could cause a lamp installer to fall from a 3 meter high ladder, by way of example. The lower, predetermined RMS milliamp value of 5 is the value chosen by UL in the U.S.A. at 60 Hz as meeting the UL 1598c standard in the U.S.A., which was formulated by UL for mitigating the above-mentioned potentially life-threatening electrical shock hazard to an installer of an LED lamp. From the foregoing table, it can be seen that the predetermined rms value of 5 is desirably below the threshold of "[p]ain with voluntary muscle control maintained."

The mentioned UL 1598c standard requires testing at 60 Hz, for example, and also at frequencies that would be produced by a fluorescent lamp electronic ballast. As noted above, such ballasts can have various frequencies, typically in the range from 20 KHz to 100 KHz. The human body can tolerate a higher level of current at higher frequencies, as a comparison of the last two columns of data in the foregoing table indicates. Because the human body can tolerate a higher level of current at higher frequencies than the mentioned 50 Hz or 60 Hz, the UL 1598c standard allows the much higher current level of approximately 59 milliamps rms at 25 kHz and approximately 120 milliamps at 50 KHz, for instance.

Possible Second Conduction Control Means Functions

Referring to FIGS. 5, 8-9 and 12-14, second conduction control means 370 preferably performs one or more of the following functions:

(1) PERMIT SECOND CIRCUIT OPERATION. Second conduction control means 370 may be realized as a capacitor, for instance, for conducting power. The word "permit" is defined above in regard to first conduction control means function (1).

(2) PERMIT SECOND CIRCUIT TO OPERATE WITHOUT INTERFERING WITH FIRST CIRCUIT. Second conduction control means 370 also may perform the function of permitting second circuit 140 to operate without interfering with first circuit 110 during intended operation of first circuit 110; that is, when the first circuit is connected to mains power via first and second power pins 104 and 106. To realize this function, conduction control means 370 is configured as a capacitor or a switch situated in the open position, for instance, to limit conduction of current from the mains to LEDs 300 via third power pin 124 and rectifier circuit 282 of second circuit 140 when first circuit 110 is operating. Mains power is supplied to third power pin 124 when using fluorescent lamp fixture 115 of FIG. 2, for instance. Such limitation of current from the mains prevents first or second substantial types of deviation of light from LEDs 300 compared to the average luminous intensity of such LEDs that would arise from first circuit 110 being standalone. First circuit 110 would be standalone if imaginary cuts 266 and 268 were made to the circuitry of FIGS. 5, 8-9 and 12-13. The following first and second types of deviation of light are contemplated:

(1) Flicker-type deviation of light from LEDs 300 in the frequency range of 0.1 Hz to 200 Hz; and (2) Continuous-type deviation of light from LEDs 300.

A first substantial level of deviation of light of the flicker-type and the continuous-type is 10 percent. A second substantial level of deviation of light of the flicker-type and continuous-type is 5 percent for minimizing annoying flicker-type and continuous-type deviation. Measurement of luminous intensity for purposes of calculating light flicker is well known, and may utilize a photocell to constantly measure light from a light source.

(3) LIMIT CURRENT FOR DRIVING LEDs. Second conduction control means 370 may further limit current as appropriate for driving LEDs 300. Second conduction control means 370 can accomplish this function when realized as a capacitor, which presents much larger impedance at mains power frequency than at the frequency of fluorescent lamp electronic ballast 122. The mains power frequency is much lower than the ballast frequency, which follows from the fact that the mains frequency is in the range from zero to 500 Hz whereas the ballast frequency is from 10 kHz and up.

(4) PERMIT ATTAINMENT OF SHOCK HAZARD PROTECTION. A possible function of second conduction control means 370 is to permit the mitigation of a potentially life-threatening electrical shock hazard when such a lamp 102 (FIGS. 1-4) is inserted into a fluorescent lamp fixture (e.g., 100, 115, 120 or 130 of FIGS. 1-4) by an installer. For this purpose, second conduction control means 370 can be configured in cooperation with first conduction control means 350, as described above in the paragraphs starting with "(4) PERMIT ATTAINMENT OF SHOCK HAZARD PROTECTION" and ending just before the heading that states "Possible Second Conduction Control Means."

Providing Shock Hazard Protection—Other Techniques

The foregoing possible functions of permitting shock hazard protection for the first and second conduction control means 350 and 370 in FIGS. 5, 12-13 and 14 can be realized in other ways. For instance, one can use isolation transformer 382 (FIG. 8) or an isolated LED power supply, e.g., 220 (FIG. 10) rather than a non-isolating LED power supply, e.g., 250 (FIG. 11) in lieu of is instead of realizing second conduction control means 370 as a capacitor or switch. It is also possible to aggregate multiple means of preventing mains power from reaching any "exposed power pin" without departing from the teaching of the present invention. "Exposed power pin" has the same meaning as discussed above in the Shock Hazard Protection functions for the first and second conduction control means 350 and 370.

Figure 16:
FIG. 16 shows various electrical schematic diagrams of alternative embodiments of the conduction control means shown in FIG. 5 and in FIGS. 12-14 in tabular form and provides other qualifications for those embodiments.

Tabular Listing of Embodiments 1-13 of First and Second Conduction Control Means FIG. 16 shows a tabular listing of Embodiments 1-13 of first and second conduction control means 350 and 370. The tabular listing includes a column referring to the need for an isolated or non-isolated type of first circuit 110 shown in FIGS. 5, 8-9, 12 and 13. Another column in the tabular listing mentions which of fluorescent lamp fixtures 100 (FIG. 1) 115 (FIG. 2), 120 (FIG. 3) or 130 (FIG. 4) are associated with each embodiment. A further column mentions, for each embodiment, whether such embodiment shares LEDs or does not share LEDs in the sense of powering such LEDs for illumination along a length of LED lamp 102. Circuitries 200 (FIG. 5), 380 (FIG. 8), 390 (FIG. 9), 1200 (FIG. 12) and 1300 (FIG. 13) share LEDs as between first and second circuits 110 and 140, and circuitry 1400 (FIG. 14) does not share LEDs as between first and second circuits 110 and 140.

Embodiments 1-13

For all Embodiments 1-13 as indicated in FIG. 16, the following First Conduction Control Functions can be achieved according to the following table:

| Realization of First Conduction Control Means 350 | First Conduction Control Means 350 Functions |
| --- | --- |
| Capacitor 352 | (1)-(4) |
| Switch 354 | (1)-(2) and (4) |
| Short circuit 358 | (1) |

As is well known in the art, capacitor 352 may more generally be referred to as a capacitance. The more general term "capacitance" covers the use of multiple capacitors to achieve a desired capacitance.

For all Embodiments 1-13 as indicated in FIG. 16, the following Second Conduction Control Functions can be achieved according to the following table:

| Realization of Second Conduction Control Means 370 | Second Conduction Control Means 370 Functions |
| --- | --- |
| Capacitor 374 | (1)-(4) |
| Switch 376 | (1)-(2) and (4) |
| Short circuit 372 | (1) |

Short circuits 352 and 358 of first and second conduction control means 350 and 370 are included in the phrase "conduction control means" as used herein. However, the "control" aspect of short circuits 352 and 358 is to always be conductive. This contrasts with "control" of a switch, for instance, which can alternately be conducting and non-conducting.

Further, short circuit 352 of first conduction control means 350 is intended to enable conduction between second power pin 106 and second circuit 140. Similarly, short circuit 358 of second conduction control means 370 is intended to enable conduction between third power pin 124 and second circuit 140.

For all Embodiments 1-13, reference is made to the tabular listing in FIG. 16, whose contents will not necessarily be repeated here. For all Embodiments 1-13, it is desirable to provide a warning on product packaging, etc., indicating that lamp installation or removal should proceed only when mains power to the fluorescent lamp fixture has been turned off.

Embodiments 1-2 and 11-13 may not achieve shock hazard protection discussed above as possible functions of the first and second current conduction control means 350 or 370. This is because Embodiments 1, 2 and 11-13 realize first conduction control means 350 as a short circuit 358. Therefore, with these embodiments, it is especially important to provide the warning on product packaging, etc., mentioned above.

In regard to Embodiments 9 and 10, both of which relate to circuitry 1400 of FIG. 14, FIG. 16 shows two possible combinations of first and second conduction control means 350 and 370. Alternatively, first and second conduction control means 350 and 370 of FIG. 14 could be embodied in the same way that FIG. 16 shows for Embodiments 5-8, by way of example.

In regard to Embodiments 5-10, although it is preferred to use a less costly first circuit 110 that is non-isolated, a more costly first circuit 110 that is isolated could also be used.

Referring to FIG. 11, Embodiment 11 realizes first and second conduction control means 350 and 370 as short circuits 358 and 372, respectively. By avoiding fluorescent lamp fixture 115 (FIG. 2) that provides mains power to all four power pins 104, 106, 124 and 126, and by making the LED power supply shown within first circuit 110 to be of the isolated type, the following advantage is attained: non-interference by the second circuit 140 with the first circuit 110 concerning both the flicker and continuous types of interference as discussed above.

Embodiment 12 uses an isolated type of LED power supply within first circuit 110, and avoids use of fluorescent lamp fixture 115 (FIG. 2) that provides mains power to all four power pins 104, 106, 124 and 126, to attain the following advantage: non-interference by the second circuit 140 with the first circuit 110 concerning both the flicker and continuous types of interference as discussed above.

Embodiment 13, in which first and second conduction control means 350 and 370 are realized as short circuits 358 and 372, respectively, relies on the non-sharing of LEDs, in the sense of powering such LEDs for illumination along a length of LED lamp 102 to attain the following advantage: Non-interference by the second circuit 140 with the first circuit 110 concerning both the flicker and continuous types of interference as discussed above.

Referring to FIG. 16, switches 354 and 376 can be implemented in various forms. They could constitute mechanical switches, and in Embodiment 8 that uses both switches, it is preferable for the switches to be mechanically coupled to each other, as indicated by phantom line 400, so that controlling one switch controls both switches. This type of mechanical switch is known as a double-pole-single-throw switch. Switches 354 and 376 could alternatively be configured as electronic switches such as FETs, for instance, that are in a non-conducting state when not energized.

For safety, it is desirable for any switches used to realize first or second conduction control 350 or 370 to be provided to an installer in an open, or non-conducting, state. Once an installer verifies that a lamp will be installed in either fluorescent lamp fixture 100 (FIG. 1) or 115 (FIG. 2), the switches should remain open. In contrast, once an installer verifies that a lamp will be installed in either fluorescent lamp fixture 120 (FIG. 3) or 130 (FIG. 4), the switches should then be closed.

Capacitors 352 and 374 shown in FIG. 16 can be reduced in size and cost when LEDs 300 of circuitry 200 of FIG. 5 are realized as shown in either FIG. 6 or FIG. 7, as discussed above in connection with those figures.

The following is a list of reference numerals and associated parts as used in this specification and drawings:

| Reference Numeral | Part |
| --- | --- |
| 100 | Fluorescent lamp fixture |
| 102 | LED lamp |
| 104 | First power pin |
| 105 | Power contact |
| 106 | Second power pin |
| 107 | Power contact |
| 108 | Electrical short |
| 109 | Power source |
| 110 | First circuit |
| 115 | Fluorescent lamp fixture |
| 120 | Fluorescent lamp fixture |
| 122 | Fluorescent lamp electronic ballast |
| 123 | Fluorescent lamp electronic ballast |
| 124 | Third power pin |
| 125 | Power contact |
| 126 | Fourth power pin |
| 127 | Power contact |
| 128 | Electrical short |
| 130 | Fluorescent lamp fixture |
| 140 | Second circuit |
| 200 | Circuitry |
| 220 | Isolated power supply |
| 222 | Output |
| 224 | Output |
| 228 | Isolation transformer |
| 230 | Full-wave rectifier circuit |
| 232 | FET |
| 233 | Gate |
| 240 | Flyback diode |
| 242 | Capacitor |
| 250 | Non-isolated power supply |
| 252 | FET |
| 253 | Gate |
| 254 | Capacitor |
| 256 | Inductor |
| 258 | Capacitor |
| 260 | Diode |
| 262 | Bypass capacitor |
| 264 | Bypass capacitor |
| 264 | Bypass capacitor |
| 265 | Bypass capacitor |
| 266 | Imaginary cut |
| 268 | Imaginary cut |
| 282 | Rectifier circuit |
| 300 | LEDs |
| 301 | LEDs |
| 302 | LEDs |
| 303 | LED circuit |
| 304 | LED circuit |
| 306 | Node |
| 307 | Node |
| 308 | Node |
| 310 | Node |
| 311 | Node |
| 312 | Node |
| 314 | Steering diode |
| 315 | Steering diode |
| 316 | Steering diode |
| 317 | Steering diode |
| 318 | Steering diode |
| 319 | Steering diode |
| 320 | Steering diode |
| 321 | Steering diode |
| 324 | Electrolytic capacitor |
| 325 | Blocking diode |
| 326 | LED circuit unit |
| 327 | LED circuit unit |
| 328 | Steering diode |
| 329 | Steering diode |
| 330 | Steering diode |
| 331 | Steering diode |
| 332 | Steering diode |
| 333 | Steering diode |
| 334 | Steering diode |
| 335 | Steering diode |
| 337 | Interface FET |
| 338 | Body diode |
| 339 | First conductor |
| 340 | Bias circuit |
| 341 | Bypass capacitor |
| 342 | Interface FET |
| 343 | Body diode |
| 344 | Second conductor |
| 345 | Bias circuit |
| 346 | Bypass capacitor |
| 350 | First conduction control means |
| 352 | Capacitor |
| 354 | Switch |
| 358 | Short circuit |
| 370 | Second conduction control means |
| 372 | Short circuit |
| 374 | Capacitor |
| 376 | Switch |
| 380 | Circuitry |
| 382 | Isolation transformer |
| 390 | Circuitry |
| 392 | Autotransformer |
| 394 | Conductor |
| 400 | Electrical or mechanical coupling |
| 1200 | Circuitry |

-continued

| Reference Numeral | Part |
| --- | --- |
| 1202 | Node |
| 1204 | Node |
| 1300 | Circuitry |
| 1302 | Node |
| 1304 | Node |
| 1400 | Circuitry |
| 1500 | Arrangement |
| 1510 | Lampholder |
| 1511 | First power contact |
| 1512 | Second power contact |
| 1520 | Voltage source |
| 1530 | Connector |
| 1535 | Apparatus |
| 1540 | Electrical probe |
| 1550 | Component |
| 1555 | Component |

The foregoing describes an LED lamp that can be retrofit into an existing fluorescent lamp fixture and that has dual mode operation from an existing fluorescent lamp electronic ballast associated with the lamp fixture, as well as, alternatively, directly from power mains. Beneficially, the LED lamp can be configured to mitigate a potentially life-threatening electrical shock hazard when such a lamp is placed into a fixture wired to supply power directly from power mains. Some embodiments of the inventive lamp are configured to provide additional protection against shock exposure to a lamp installer.

The scope of the claims should not be limited by the preferred embodiments and examples, but should be given the broadest interpretation consistent with the written description as a whole.

What is claimed is:

1. An LED lamp with dual mode operation for insertion into a fluorescent lamp fixture, wherein the lamp fixture is wired to supply to the LED lamp either mains power or power from an electronic ballast supplying AC power at a ballast frequency, comprising:
   a) an elongated housing having first and second ends;
   b) the first end of the elongated housing being provided with first and second power pins;
   c) the second end of the elongated housing being provided with a third power pin;
   d) a first circuit intended to provide power to at least one LED contained within the elongated housing; the foregoing at least one LED adapted to be powered in a first mode from power mains and to provide external light along a length of the elongated housing; the first mode occurring when the LED lamp is inserted into a fluorescent lamp fixture having power contacts that receive the first and second power pins and that are directly connected to said power mains supplying power at a mains frequency much lower than the ballast frequency; the first circuit limiting current to the at least one LED adapted to be powered in a first mode;
   e) a second circuit intended to provide power to at least one LED contained within the elongated housing; the foregoing at least one LED adapted to be powered in a second mode from said electronic ballast and to provide external light along a length of the elongated housing; the second mode occurring when the LED lamp is inserted into a fluorescent lamp fixture having power contacts that receive the second and third power pins, at opposite lamp ends, and that are connected to said electronic ballast for receiving power therefrom; the second circuit including a rectifier circuit adapted to receive power from the second and third power pins;
   f) a first conduction control means serially connected between the second power pin and the rectifier circuit is adapted to permit the second circuit to power the at least one LED adapted to be powered in the second mode when the second and third power pins, at opposite lamp ends, are connected to said electronic ballast; and
   g) a second conduction control means serially connected between the third power pin and the rectifier circuit is adapted to permit the second circuit to power the at least one LED adapted to be powered in the second mode when the second and third power pins, at opposite lamp ends, are connected to said electronic ballast.

2. The LED lamp of claim 1, wherein:
   a) the at least one LED adapted to be powered in a first mode and the at least one LED adapted to be powered in a second mode have at least one LED in common; and
   b) the first conduction control means adapted to prevent an interfering level of mains power from reaching the second circuit via the second power pin when operation of the first circuit is enabled by direct connection of the first and second power pins to said power mains supplying power at a mains frequency; said interfering level of mains power defined by:
      i) flicker-type deviation of light from the at least one LED adapted to be powered in the first mode in the frequency range of 0.1 Hz to 200 Hz of at least 10 percent; or
      ii) continuous-type deviation of light from the at least one LED adapted to be powered in the first mode of at least 10 percent,
   when the flicker-type and continuous-type deviations are compared to the average luminous intensity of light of the at least one LED adapted to be powered in the first mode that would arise from the first circuit being standalone.

3. The LED lamp of claim 1, wherein:
   a) the at least one LED adapted to be powered in a first mode and the at least one LED adapted to be powered in a second mode have at least one LED in common; and
   b) the second conduction control means adapted to prevent an interfering level of mains power from reaching the second circuit via the third power pin when operation of the first circuit is enabled by direct connection of the first and second power pins to said power mains supplying power at a mains frequency; said interfering level of mains power defined by:
      i) flicker-type deviation of light from the at least one LED adapted to be powered in the first mode in the frequency range of 0.1 Hz to 200 Hz of at least 10 percent; or
      ii) continuous type deviation of light from the at least one LED adapted to be powered in the first mode of at least 10 percent,
   when the flicker-type and continuous-type deviations are compared to the average luminous intensity of light of the at least one LED adapted to be powered in the first mode that would arise from the first circuit being standalone.

4. The LED lamp of claim 3, wherein:
   a) a transformer is coupled between the rectifier circuit of the second circuit and said first and second conduction control means, wherein first and second ends of a winding of the transformer are coupled to the first and second conduction control means, respectively; and b) the transformer having a winding turns ratio that reduces the level of current supplied from the second circuit to the at least one LED being powered in a second mode compared to when said winding turns ratio is 1:1.

5. The LED lamp of claim 4, wherein the transformer is an isolation transformer.

6. The LED lamp of claim 4, wherein the transformer is an autotransformer.

7. The LED lamp of claim 1, wherein the first and second conduction control means are configured to prevent current conduction in an amount exceeding a predetermined RMS milliamps value of 10 at 50 Hz and at 60 Hz when measured through a circuit connected, via a probe, directly between a selected power pin and earth ground and consisting of first and second serially connected components, the first component consisting of the parallel combination of a non-inductive 1500 ohm resistor and a 0.22 microfarad capacitor and the second component consisting of a non-inductive 500 ohm resistor, when selected power pins of the LED lamp are connected to first and second power contacts, wherein the first power contact is powered by a fixed voltage or a voltage that is varied across a range of voltage that conforms to mains voltage or voltages that are intended to power said first circuit and the second power contact is connected to earth ground, for each of the following situations:

a) the first power pin is connected to the first power contact and the second power pin is connected to the second power contact, the probe being connected to third power pin;

b) the first power pin is connected to the first power contact and the second power pin is connected to the second power contact, the probe being connected to a fourth power pin;

c) the third power pin is connected to the first power contact and the fourth power pin is connected to the second power contact, the probe being connected to the first power pin;

d) the third power pin is connected to the first power contact and the fourth power pin is connected to the second power contact, the probe being connected to the second power pin;

e) the second power pin is connected to the first power contact and the first power pin is connected to the second power contact, the probe being connected to the third power pin;

f) the second power pin is connected to the first power contact and the first power pin is connected to the second power contact, the probe being connected to the fourth power pin;

g) the fourth power pin is connected to the first power contact and the third power pin is connected to the second power contact, the probe being connected to the first power pin; and h) the fourth power pin is connected to the first power contact and the third power pin is connected to the second power contact, the probe being connected to the second power pin.

8. The LED lamp of claim 7, wherein the first and second conduction control means are configured to attain the value of 5 as said predetermined RMS milliamps value.

9. The LED lamp of claim 1, wherein the first circuit is an active circuit and the second circuit is a passive circuit.

10. The LED lamp of claim 1, wherein the number of the at least one LED adapted to be powered in a first mode is higher than the number of the at least one LED adapted to be powered in a second mode.

11. The LED lamp of claim 1, wherein the number of the at least one LED adapted to be powered in a second mode is higher than the number of the at least one LED adapted to be powered in a first mode.

12. The LED lamp of claim 1, wherein:

a) the first circuit includes an isolation transformer exclusively coupling a first portion of the first circuit that contains inputs adapted to receive mains power to a second portion of the first circuit which contains outputs adapted to provide conditioned power to the at least one LED adapted to be powered in a first mode; and b) the isolation transformer limiting conduction therethrough to less than 10 milliamps at the mains frequency.

13. The LED lamp of claim 1, wherein:

a) the first and second circuits are configured so that the at least one LED adapted to be powered in the first mode and the at least one LED adapted to be powered in the second mode are separate from each other; and b) the second circuit is configured to avoid, during the first mode, powering the at least one LED adapted to be powered during the first mode.

14. The LED lamp of claim 1, wherein:

a) the at least one LED adapted to be powered in a first mode and the at least one LED adapted to be powered in a second mode have all LEDs in common and comprise a plurality of strings of LEDs with each string having at least one LED; and b) the LED lamp includes a first LED circuit unit including at least first and second strings of LEDs of the plurality of strings of LEDs;

c) the first LED circuit unit is adapted so that:

i) when powered by the first circuit, the at least first and second strings of LEDs are operated in parallel such that they each have approximately the same voltage thereacross; and ii) when powered by the second circuit, the at least first and second strings of LEDs are operated in series such that the voltage applied to the at least first and second strings of LEDs by the second circuit is approximately the sum of the respective voltages across each of the at least first and second strings of LEDs.

15. The LED lamp of claim 14, wherein the first LED circuit unit comprises steering diodes to allow operation of the at least first and second strings of LEDs in parallel when powered from the first circuit and in series when powered from the second circuit.

16. The LED lamp of claim 14, wherein:

a) the LED lamp includes a second LED circuit unit including another at least first and second strings of LEDs of the plurality of strings of LEDs;

b) the second LED circuit unit is adapted so that:

i) when powered by the first circuit, the another at least first and second strings of LEDs are operated in parallel such that they each have approximately the same voltage thereacross; and ii) when powered by the second circuit, the another at least first and second strings of LEDs are operated in series such that the voltage applied to the another at least first and second strings of LEDs by the second circuit is approximately the sum of the respective voltages across each of the another at least first and second strings of LEDs.

17. The LED circuit of claim 14 or 16, wherein:
 a) the first circuit is connected to the plurality of strings of LEDs by first and second conductors; and
 b) an arrangement for isolating the first circuit from unipolar current coming from the plurality of strings of LEDs, when the foregoing LEDs are intended to be powered from the second circuit, comprises one or both of:
  i) an isolating means that interfaces the first conductor with the plurality of strings of LEDs; and
  ii) an isolating means that interfaces the second conductor with the plurality of strings of LEDs.

18. The LED circuit of claim 17, wherein each of said one or both of an isolating means that interfaces the first conductor with the plurality of strings of LEDs and an isolating means that interfaces the second conductor with the plurality of strings of LEDs comprises a field-effect transistor.

19. The LED circuit of claim 17, wherein said arrangement for isolating the first circuit from unipolar current coming from the plurality of strings of LEDs, when the foregoing LEDs are intended to be powered from the second circuit, comprises both:
 a) said isolating means that interfaces the first conductor with the plurality of strings of LEDs; and
 b) said isolating means that interfaces the second conductor with the plurality of strings of LEDs.

20. The LED circuit of claim 19, wherein said isolating means that interfaces the first conductor with the plurality of strings of LEDs and said isolating means that interfaces the second conductor with the plurality of strings of LEDs each comprises a field-effect transistor.

* * * * *